(12) United States Patent
Robic

(10) Patent No.: US 11,391,202 B2
(45) Date of Patent: Jul. 19, 2022

(54) CVC COMBUSTION MODULE FOR AIRCRAFT TURBOMACHINE COMPRISING SUB-ASSEMBLIES OF INDEPENDENT CHAMBERS

(71) Applicant: SAFRAN AIRCRAFT ENGINES, Paris (FR)

(72) Inventor: Bernard Robic, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 92 days.

(21) Appl. No.: 16/784,466

(22) Filed: Feb. 7, 2020

(65) Prior Publication Data

US 2020/0256247 A1    Aug. 13, 2020

(30) Foreign Application Priority Data

Feb. 13, 2019   (FR) ..................................... 1901455

(51) Int. Cl.
     *F02C 5/00*         (2006.01)
     *F02C 5/12*         (2006.01)
     *F23R 7/00*         (2006.01)

(52) U.S. Cl.
     CPC . *F02C 5/12* (2013.01); *F23R 7/00* (2013.01)

(58) Field of Classification Search
     CPC ...... F02C 5/00; F02C 5/02; F02C 5/12; F02C 7/057; F23R 7/00; F23R 2900/03281;

(Continued)

(56) References Cited

U.S. PATENT DOCUMENTS 4,288,980 A  *  9/1981  Ernst ....................... F23R 3/002
                                                  60/39.23
7,448,200 B2 * 11/2008  Lupkes .................... F02C 3/16
                                                    60/247

(Continued)

FOREIGN PATENT DOCUMENTS

FR         2829528 A1    3/2003
FR         2945316 A1   11/2010

(Continued)

OTHER PUBLICATIONS

Preliminary Search Report issued in French Patent Application No. 1901455 dated Nov. 7, 2019.

*Primary Examiner* — Gerald L Sung
(74) *Attorney, Agent, or Firm* — Pearne & Gordon LLP

(57) ABSTRACT

A module (4) for an aircraft turbomachine comprises an assembly of constant-volume combustion chambers, and including a first sub-assembly of first chambers succeeding each other along a given sense (76) and forming series of chambers (S1), and within each series (S1), a first ignition chamber (C1.1) located at one of both circumferential ends of the series is defined, the first ignition chamber (C1.1) being connected to the first directly consecutive chamber (C1.2) along the given sense (76) so as to supply the same with exhaust gases, and so forth up to the first chamber (C1.3) located at the other circumferential end of the series. In addition, a control device (46) is configured such that for all the first ignition chambers (C1.1), diametrically opposite two by two, the combustion cycles are simultaneously initiated. Finally, a second sub-assembly comprising second combustion chambers (C2.1-C2.3) is also provided.

19 Claims, 18 Drawing Sheets

(58) Field of Classification Search
CPC ... F02K 7/06; F02K 7/067; F02K 7/02; F02K 7/075
See application file for complete search history.

(56) References Cited

U.S. PATENT DOCUMENTS

| | | | |
|---|---|---|---|
| 2004/0154306 A1* | 8/2004 | Benians | F02C 5/02 60/776 |
| 2004/0216464 A1* | 11/2004 | Lupkes | F23R 7/00 60/776 |
| 2009/0266047 A1* | 10/2009 | Kenyon | F23R 3/425 60/39.76 |
| 2012/0017563 A1* | 1/2012 | Aguilar | F01D 17/14 60/39.76 |
| 2013/0236842 A1 | 9/2013 | Nalim et al. | |
| 2015/0204240 A1* | 7/2015 | Robie | F02C 5/12 60/39.23 |
| 2018/0010517 A1* | 1/2018 | Leyko | F23R 3/46 |
| 2019/0136760 A1 | 5/2019 | Robic | |

FOREIGN PATENT DOCUMENTS

| | | |
|---|---|---|
| FR | 2994250 A1 | 2/2014 |
| FR | 3032024 A1 | 7/2016 |
| GB | 781482 A | 8/1957 |

\* cited by examiner

CVC COMBUSTION MODULE FOR AIRCRAFT TURBOMACHINE COMPRISING SUB-ASSEMBLIES OF INDEPENDENT CHAMBERS

This application claims priority from French Patent Application 1901455 filed Feb. 13, 2019, the entire content of which is incorporated by reference herein.

TECHNICAL FIELD

The invention relates to the field of combustion chambers of aircraft turbomachines, of the constant-volume combustion type.

The invention is applicable to any type of turbomachine, in particular turbojet engines, turboprop engines, and turbomachines with open rotors.

STATE OF PRIOR ART

Conventionally, the combustion chamber of an aircraft turbomachine operates according to the so-called constant pressure combustion Brayton cycle. However, for a specific consumption gain, it can be contemplated to replace the Brayton cycle combustion chamber with a so-called constant-volume combustion (CVC) Humphrey cycle combustion chamber.

Document FR 2 945 316 describes an exemplary embodiment of such a CVC combustion chamber. The chamber comprises at the inlet a compressed gas intake valve capable of oscillating between an open position and a closed position, and includes at the outlet an exhaust gas discharge valve also capable of oscillating between an open position and a closed position. The positions of the valves are synchronously driven in order to implement the three successive phases of the Humphrey cycle, namely intake-combustion-exhaust. Document FR 2 994 250 shows an improved solution, in particular in terms of robustness and tightness to the strong pressurisation observed during the combustion phase. This solution consists in using intake and exhaust valves with spherical plugs.

However, the module integrating such combustion chambers is still to be improved, in particular in terms of overall performances.

DISCLOSURE OF THE INVENTION

To meet this need, one object of the invention is a module for an aircraft turbomachine comprising an assembly of combustion chambers distributed about a central axis of the module, each chamber being of the constant-volume combustion type and comprising a compressed gas intake means for taking in compressed gas into a combustion enclosure of the chamber as well as an exhaust gas discharge means for discharging exhaust gas from the enclosure, the module also comprising a device for controlling the gas intake means and exhaust gas discharge means, According to the invention, the assembly of chambers comprises a first and a second sub-assembly of chambers, the first sub-assembly comprising a number N1 of first chambers diametrically opposite two by two and evenly distributed about the central axis of the module, the number N1 corresponding to a positive integer higher than or equal to six, the first chambers being distributed within a number 2*N2 of first identical series each comprising a number N3 of first chambers succeeding each other along a given sense of a circumferential direction of the assembly relative to the central axis, the numbers N2 and N3 corresponding to positive integers respectively higher than or equal to one and three, and within each first series, a first ignition chamber or a first group of directly consecutive first ignition chambers located at one of both circumferential ends of the series is defined, the first ignition chamber/the first group being connected to the first directly consecutive chamber/a second group of first directly consecutive chambers along said given sense so as to supply the same with exhaust gases, and so forth up to the first chamber/a group of first chambers located at the other of both circumferential ends of the series, the control device being configured such that for all the first ignition chambers, diametrically opposite two by two, the combustion cycles are simultaneously initiated, and the second sub-assembly comprising a number N'1 of second chambers diametrically opposite two by two, the number N'1 corresponding to a positive integer higher than or equal to four.

By means of the first combustion chambers of the first sub-assembly, the module generates at its outlet a gas flow in the form of a rotational wave promoting driving the turbine through which this flow has to pass. This feature specific to the invention, implemented by a phase shift in controlling the chambers, enables the overall performances of the combustion module to be improved. First, the exhaust gas recirculation from one chamber to another turns out to be particularly well adapted to setting such a phase shift of the first chambers within each first series. Then, this recirculation advantageously enables the automatic ignition of the chambers supplied with these gases, called exhaust gas (EGR for "Exhaust Gas Recirculation") to be achieved.

Additionally, the presence of a second sub-assembly of second chambers, independent of the first sub-assembly, provides the possibility of many additional functionalities for the combustion module. The second chambers of the second sub-assembly can actually be functionalised in many ways, for example to facilitate the obtention of the aforementioned rotational wave. Alternatively, these second combustion chambers can be simultaneously and temporarily controlled in association with the first chambers, during the transitory phases aiming at producing an outlet flow with maximum power.

The second chambers can also enable the use of another fuel than that used in the first chambers, in particular for the purpose of pollutant particle reduction. They can also assume different orientations/geometries from those of the first chambers, for the purpose of modifying the outlet rotational wave, in order to limit blocking risks for the turbine arranged downstream.

Additionally, the invention provides at least one of the following optional characteristics, taken alone or in combination.

The number N'1 of second chambers is identical to the number N1 of first chambers, the second chambers are evenly distributed about the central axis of the module, and the first and second chambers form an assembly of chambers which are preferably evenly distributed about the central axis of the module, and preferably alternately arranged.

The second chambers are distributed within the 2*N2 second identical series number of and each comprising the number N3 of second chambers succeeding each other along the given sense, and within each second series, a second ignition chamber or a first group of second ignition chambers located at one of both circumferential ends of the series is defined, the second ignition chamber/the first group being connected to the directly consecutive second chamber/a second group of directly consecutive second chambers along said given sense so as to supply the same with exhaust gases, and so forth up to the second chamber/a group of second chambers located at the other of both circumferential ends of the series. In this case, the second chambers are advantageously involved in forming the rotational wave applied to the turbine.

The control device is configured such that for all the second ignition chambers, diametrically opposite two by two, the combustion cycles are simultaneously initiated with the first ignition chambers.

Alternatively, the control device is configured such that for all the second ignition chambers, diametrically opposite two by two, the combustion cycles are simultaneously initiated, with a delay relative to the first ignition chambers.

The sum of the numbers N1 and N'1 can be very variable, for example between 10 and 100. The combustion chambers have at least one of the following characteristics, and preferably several of them:

- the combustion enclosure of each chamber extends about a central axis of the chamber having a tilt relative to the central axis of the module, the central axes of the chambers being preferentially parallel to each other;
- the combustion enclosures of the first chambers have a different volume from that of the second chambers, preferably by having different lengths and/or diameters;
- the exhaust gas discharge means of the first chambers are offset from the exhaust gas discharge means of the second chambers, along the central axis of the module.

The combustion enclosures of the first chambers of the first sub-assembly are supplied with a different fuel from that supplying the second chambers of the second sub-assembly, one of the fuels being preferentially hydrogen so as to reduce pollutant particle emission.

Another object of the invention is an aircraft turbomachine comprising such a module, the central axis of the module preferentially corresponding to a longitudinal central axis of the turbomachine.

Finally, one object of the invention is a method for controlling a module for such an aircraft turbomachine, the method being implemented such that:

- the combustion cycles of all the first ignition chambers are simultaneously initiated;
- within each first series, following the initiation of a combustion cycle on the first ignition chamber/the first group of the first ignition chambers located at one of both circumferential ends of the series, initiating a combustion cycle on the directly consecutive first chamber/the second group of directly consecutive first chambers along said given sense, is performed in a delayed manner and using exhaust gases from the first ignition chamber/the first group of first ignition chambers, and so forth up to the first chamber/to the group of first chambers located at the other of both circumferential ends of the series; and
- the second chambers are active and controlled by the control device over an identical activation period of time simultaneous to an activation period of time for the first chambers, or only over a reduced activation period of time relative to that of the first chambers.

Further advantages and characteristics of the invention will appear in the detailed non-limiting description below.

BRIEF DESCRIPTION OF THE DRAWINGS

This description will be made with regard to the appended drawings in which.

DETAILED DISCLOSURE OF PREFERRED EMBODIMENTS

Figure 1:
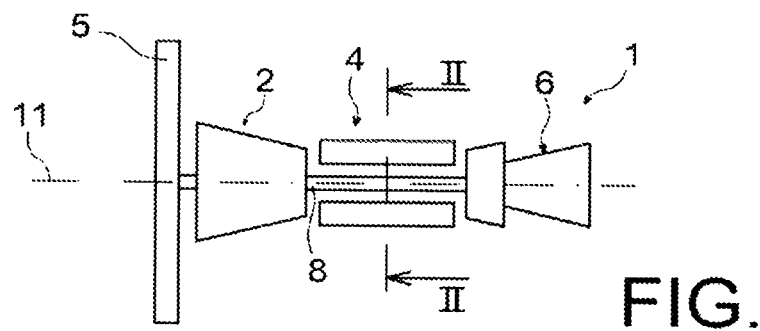
FIG. 1 represents a side schematic view of a turbojet engine according to the invention.

With reference to FIG. 1, a turbomachine 1 according to the invention, preferably a turbojet engine, is represented.

The turbojet engine 1 comprises, from upstream to downstream, a fan-type receiver 5, one or more compressor modules 2, a combustion module 4, and one or more turbine modules 6. Conventionally, compressors and turbines are connected through a system of shafts 8, which drives the receiver 5.

Figure 2:
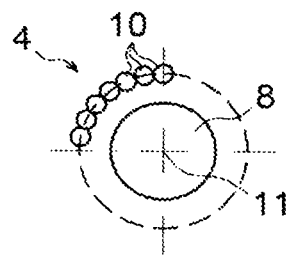
FIG. 2 represents a cross-section schematic view taken along line II-II of FIG. 1.

The combustion module 4 shown in FIG. 2 integrates an assembly of combustion chambers 10, distributed about the system of shafts 8 centred on the longitudinal central axis 11 of the turbojet engine. This axis 11 also corresponds to the central axis of the module 4, about which the chambers 10 are evenly distributed.

The chambers 10, for example between 10 and 100 chambers, are specific to the present invention for reasons which will be subsequently detailed. The number of these chambers is preferentially even, and they are arranged diametrically opposite two by two. In this manner, in case of anomaly on one of them, both diametrically opposite chambers can be disabled in order to avoid flow dissymmetries at the inlet of the turbine. The chambers 10 are to remain fixed with respect to the engine case upon operating the turbojet engine.

Each chamber 10 is of the CVC type, that is closed at its ends by two synchronised intake and exhaust valves in order to implement the three successive phases of the Humphrey cycle, namely intake-combustion-exhaust. As will be detailed hereinafter, these chambers 10 are deliberately phase shifted from each other as regards the implementation of the Humphrey combustion cycle.

Figure 3:
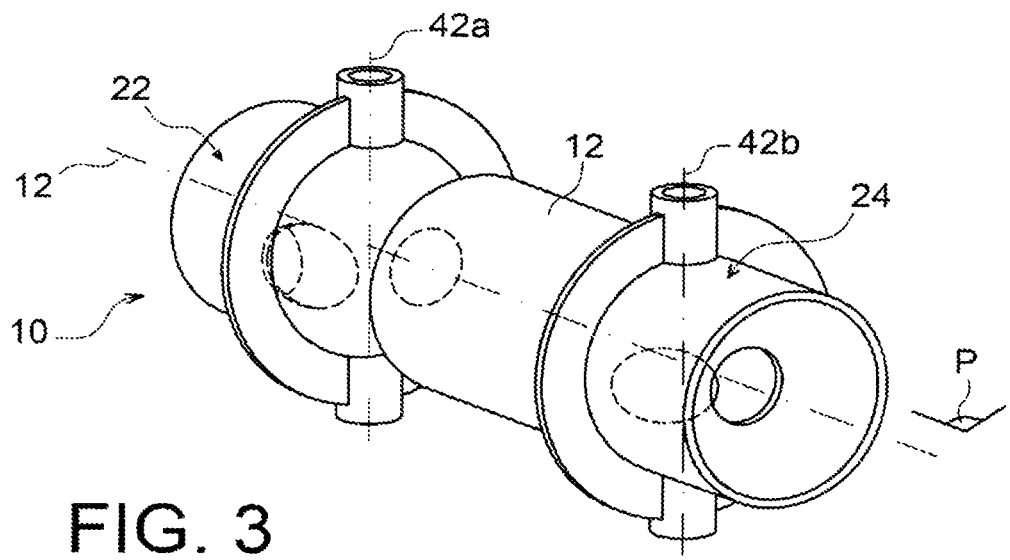
FIG. 3 is a perspective view of one of the combustion chambers equipping the combustion module shown in the previous figure.
Figure 4:
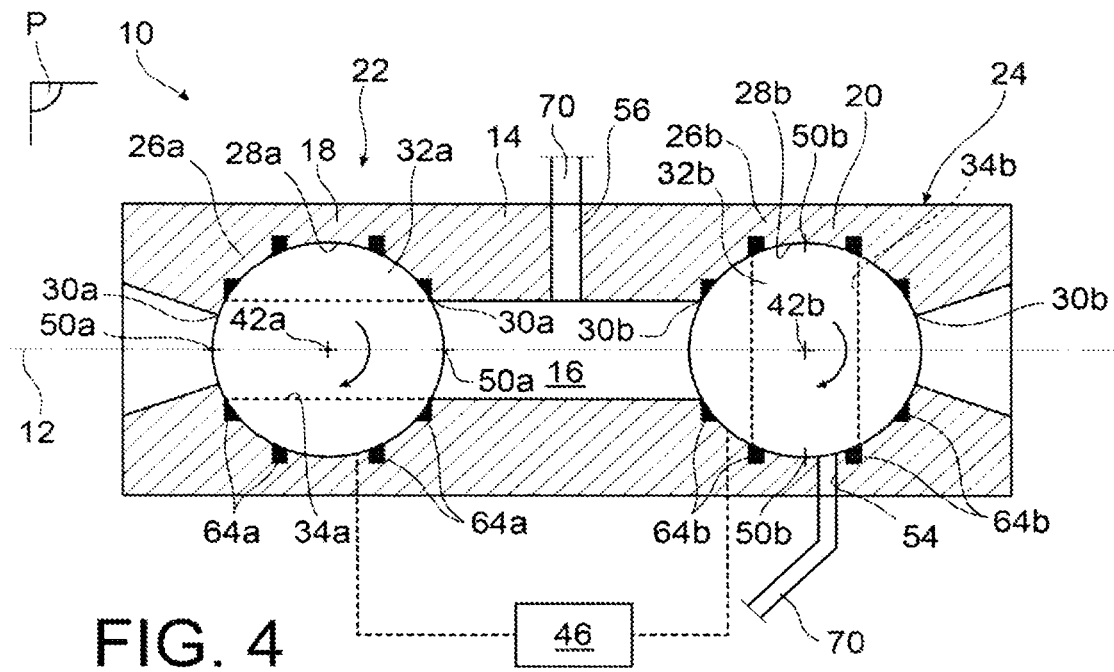
FIG. 4 is a schematic longitudinal cross-section view taken along plane P of FIG. 3.

FIGS. 3 and 4 represent one of the combustion chambers 10. In this embodiment, the other chambers have an identical or similar design. Overall the chamber 10 is oriented in parallel to the central axis of the module, extending about a central axis of the chamber 12. The chamber 10 comprises a circular cross-section cylindrical shaped side wall 14, centred on the axis 12. This side wall radially defines the boundaries of the combustion enclosure 16. At its front end, the wall 14 fixedly carries an inlet wall 18, as well as its rear end, it fixedly carries an outlet wall 20. Both walls 18, 20 are centred on the axis 12. The walls 14, 18 and 20 can be made as a single revolution piece.

The inlet wall 18 is involved in forming a compressed gas intake valve 22, as well as the outlet 20 is involved in forming an exhaust gas discharge valve 24. Both valves 22, 24 are preferentially of identical or similar designs.

The intake valve 22 comprises a fixed hollow body 26a forming a seat, and made by the wall 18. This hollow body 26a has a truncated sphere-shaped internal surface 28a with a centre located on axis 12. The diameter of this surface is slightly higher than the internal diameter of the side wall 14. At the ends of this internal surface 28a, two diametrically opposite seat ports 30a are respectively defined. That oriented on the enclosure 16 side is defined together with the end of the inlet wall 18. That located opposite, on the compressor module side, can be flared to upstream in order to facilitate introduction into the intake valve 22 of the compressed gas exiting the compressor module. Both seat ports 30a are preferably circular-shaped, and centred on the axis 12.

The internal surface 28a acts as a spherical bearing seat for a spherical plug of the intake valve, as will be detailed below. However, it is noted that the spherical bearing seat could be replaced by a cylindrical or conical bearing seat, without departing from the scope of the invention. Likewise, the spherical plug of the valve could be replaced by two interlocked spherical plugs, as is described in document FR 2 994 250 A1. Finally, the plug is not necessarily spherical, in that it can assume any other shape known to be appropriate to implement the desired combustion cycle.

The spherical plug 32a assumes a solid ball shape, through which, a gas passage 34a extending along an axis passing through the centre of this ball, corresponding to the centre of the internal bearing seat surface 28a of the body forming the seat passes. The ball 32a is preferably made as a single piece. The passage 34a of the ball 32a is preferentially of a constant cross-section, and it has two opposite ports with a centre 50a.

The spherical plug 32a is rotatably mounted with respect to the wall 18, along an axis of rotation 42a perpendicular to the central axis of the module 12, and passing through the centre of the internal spherical bearing seat 28a. The plug 32a forms a means for taking in compressed gas into the enclosure 16, rotatably controlled using a control device 46. It preferably applies a constant speed of rotation to the spherical plug 32a, along axis 42a, and still along a same direction of rotation corresponding to the clockwise direction in FIG. 4. In this regard, it is noted that the control device 46, very schematically represented in FIG. 4, conventionally comprises one or more engines controlled by a control unit, preferably FADEC. This device 46 additionally turns out to be shared with the exhaust valve 24.

Additionally, a system of seals is provided between the internal surface 28a of the fixed body and the external surface of the spherical plug 32a. They can be two substantially concentric circular compression rings 64a arranged in the proximity of the upstream port 30a, and two circular compression rings 64a arranged concentrically in the proximity of the downstream port 30a. All the circular compression rings are carried by the fixed body 26a, and arranged in planes parallel to the axis of rotation 42a.

By way of indicating purposes, the rings 64a are provided such that when the spherical plug 32a occupies a closed position (different from the open position represented in FIG. 4), compressed gases previously trapped in the gas passage 34a cannot exhaust towards the enclosure 16.

Still with reference to FIG. 4, it is noted that the exhaust gas discharge valve 24 has an identical or similar design to that of the intake valve 22 just described. Thus, the elements of the valve 24 which are identical or similar to the elements of the valve 22 have the same reference numerals, only the addition "a" being replaced with the addition "b".

The spherical plug 32b forms a means for discharging exhaust gases from the enclosure 16. It is also rotatably controlled using the control device 46, in a manner similar to that applied to the spherical plug 32a. In FIG. 4, the spherical plug 32b assumes a closed position in which both centres 50b, of both opposite ports of the gas passage 34b, are aligned along a line substantially orthogonal to the axes 12 and 42b. Conversely, in the open position of the spherical plug 32a, both centres 50a of both opposite ports of the gas passage 34a are aligned along the chamber axis 12. Each of the positions is obtained twice during a full rotation of each of both plugs 32a, 32b, which are phase shifted and driven at preferentially identical speeds of rotation.

The wall 20 of the chamber 10 is not only equipped with two upstream and downstream ports 30b, but also with one or more ports 54 for recirculating exhaust gases previously trapped in the gas passage 34b. This port 54, also called EGR ("Exhaust Gas Recirculation") port, actually enables the exhaust gas previously trapped in the aforementioned gas passage 34b to be reinjected, towards the enclosure 16 of another combustion chamber 10. To do this, one or more pipings 70 connecting each EGR port 54 of the chamber to a port 56 of another chamber are provided, this port 56 passing through the wall 18 and opening into the enclosure 16 of the other associated chamber. As will be detailed hereinafter, both chambers connected to each other through the piping(s) 70 can be adjacent, but one or more other chambers 10 of the assembly are preferentially arranged between these two chambers coupled through the EGR function.

As will be detailed hereinafter, the chamber 10 supplied with EGR exhaust gases has a phase shift in implementing the combustion cycle, herein a delay with respect to the cycle of the chamber 10 from which these exhaust gases EGR come.

Figure 5A:
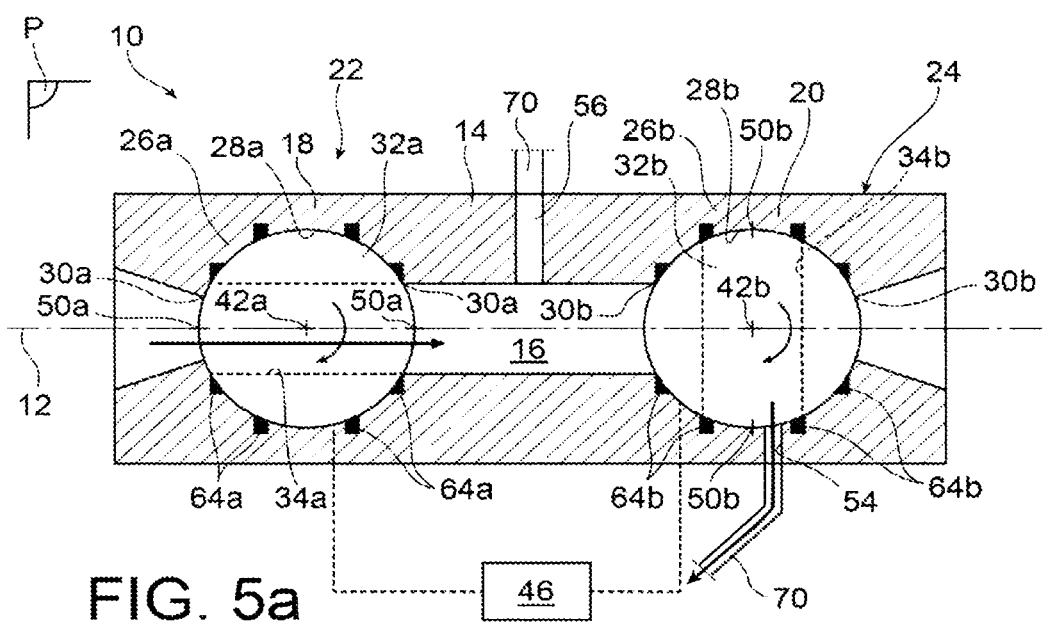
FIG. 5a represents the combustion chamber shown in the previous figure, in a state assumed during successive phases of a combustion cycle.
Figure 5B:
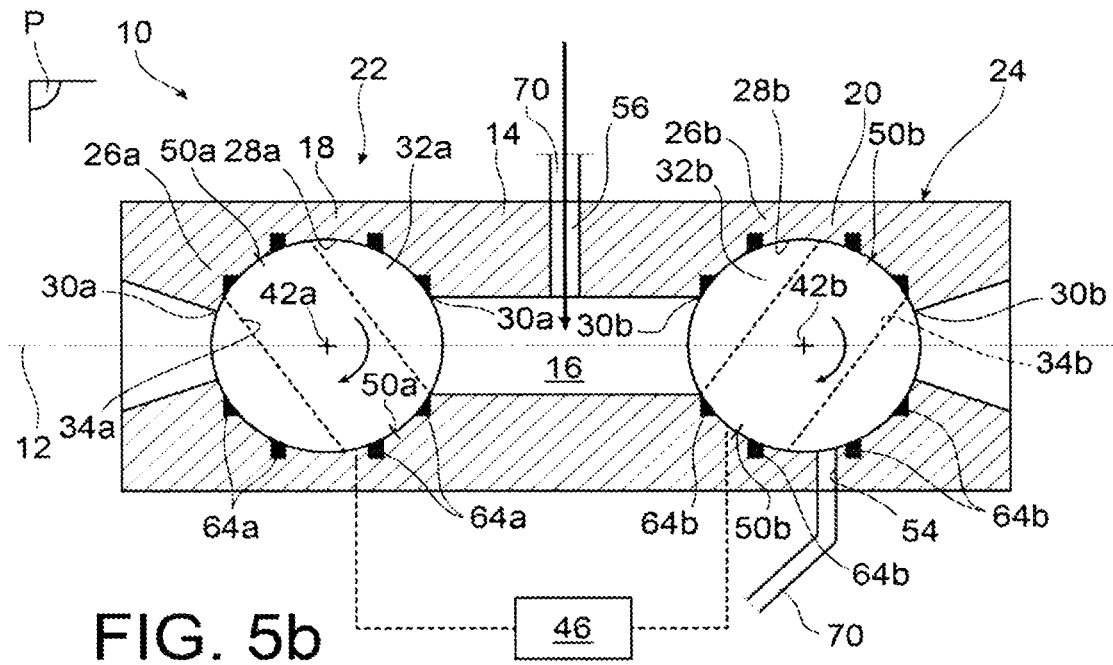
FIG. 5b represents the combustion chamber shown in the previous figure, in another state assumed during successive phases of a combustion cycle.
Figure 5C:
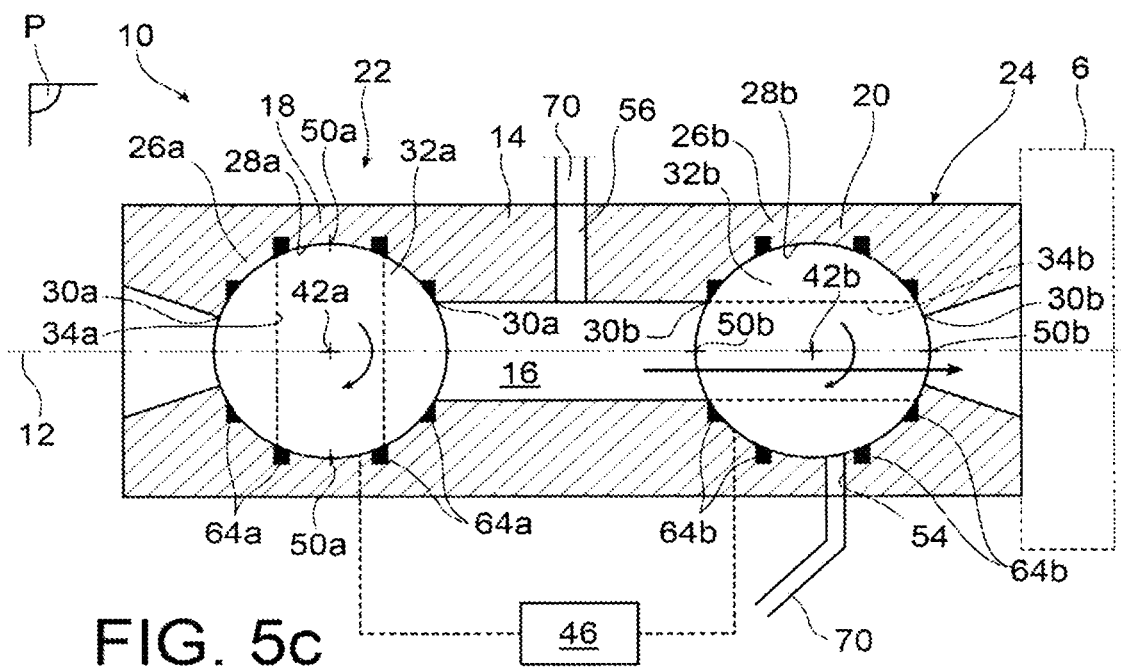
FIG. 5c represents the combustion chamber shown in the previous figure, still in another state assumed during successive phases of a combustion cycle.

With reference now to FIGS. 5a to 5c, the different phases of the constant-volume combustion cycle in the chamber 10 will be described. During this cycle, as discussed above, the control device 46 applies identical speeds with a same sense to both spherical plugs 32a, 32b of the valves. Moreover, a phase shift exists between these two synchronised intake and exhaust valves, opening and closing these valves being not performed simultaneously, as clearly appears in FIGS. 5a to 5c.

FIG. 5a shows the valves 22, 24 in a configuration enabling the phase of taking in compressed air into the enclosure 16 to be implemented, this step corresponding to the initiation of the CVC combustion cycle. In the middle of the intake phase as is represented in FIG. 5a, the cross-sectional area of the valve 22 being maximum, given that both centres 50a of the passage 34a are aligned with the chamber axis 12. At this time, the exhaust valve 24 is fully closed, to trigger the combustion phase. The passage cross-sectional area of the valve 24 turns out to be zero, since both ports 50b of the passage 34b are arranged along a line orthogonal to the chamber axis 12.

Figure 6:
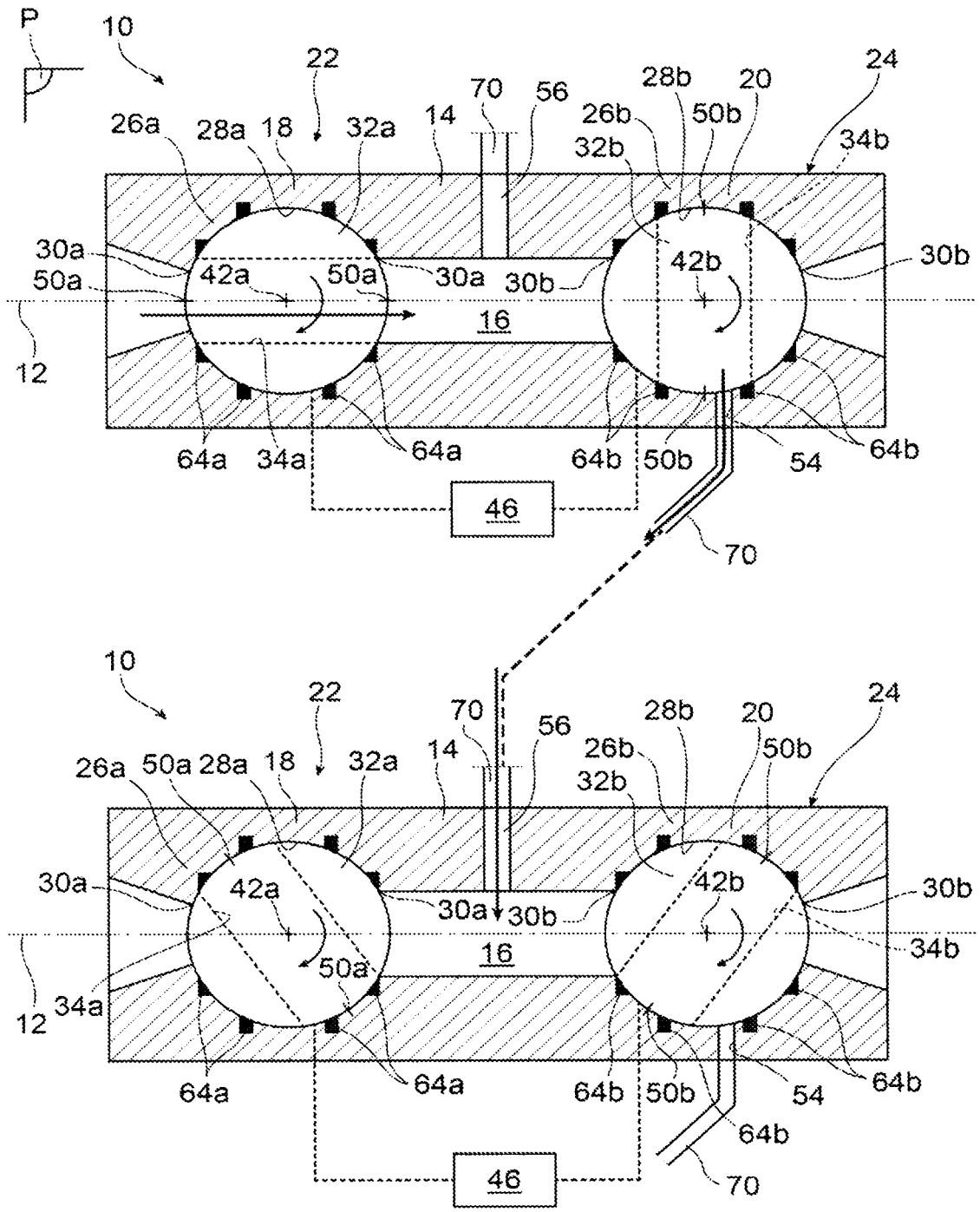
FIG. 6 depicts coupling between two combustion chambers, one of which enables the other to be supplied with EGR exhaust gases.

On the other hand, the gas passage 34b contains exhaust gases trapped during a previous cycle, these gases being released through the EGR port 54, and then circulating through the piping 70 towards another chamber 10. This principle is depicted in FIG. 6, showing the EGR exhaust gases recirculated via the port 56 towards the enclosure 16 of this other chamber 10, corresponding to that in the bottom in the figure. This other chamber 10 has a combustion cycle delayed with respect to that of the chamber delivering the EGR exhaust gases, since it is only in the combustion stage of the previous cycle. Preferably, the single introduction of the EGR exhaust gases into the enclosure 16, at the start of the combustion phase, enables ignition of the air/fuel mixture being in this enclosure to be caused. In other words, during the intake phase, the inlet of the EGR exhaust gases cause a self-ignition, and triggers the combustion phase.

FIG. 5b represents the next phase after the intake phase of FIG. 5a, namely the combustion phase during which both valves 22, 24 are closed. On the other hand, as previously explained, the enclosure 16 can receive EGR exhaust gases through the port 56 of the wall 18, additionally resulting in igniting the pressurised air-fuel mixture in the enclosure. Finally, in FIG. 5c, the valves 22 and 24 are in a configuration enabling the exhaust phase to be implemented. In the middle of the exhaust phase as is represented in FIG. 5c, the opening cross-sectional area of the valve 24 is maximum, given that both centres 50b of the passage 34b are aligned with the chamber axis 12. The exhaust gases can thus be discharged through the turbine module 6 located as an extension of the downstream port 30b of the fixed body 26b. At this instant, the intake valve 22 is fully closed, to prohibit compressed air inlet. The passage cross-sectional area of the valve 22 turns out to be zero, since both ports 50a of the passage 34a are arranged along a line orthogonal to the chamber axis 12.

Then, both plugs 32a, 32b continue rotating in the clockwise direction in order to retrieve their positions of FIG. 5a, marking the initiation of a new combustion cycle for the chamber 10. Consequently, a full combustion cycle is performed during a half-rotation of each spherical plug, or, in other words, a full rotation of each spherical plug corresponds to two full combustion cycles.

Figure 7:
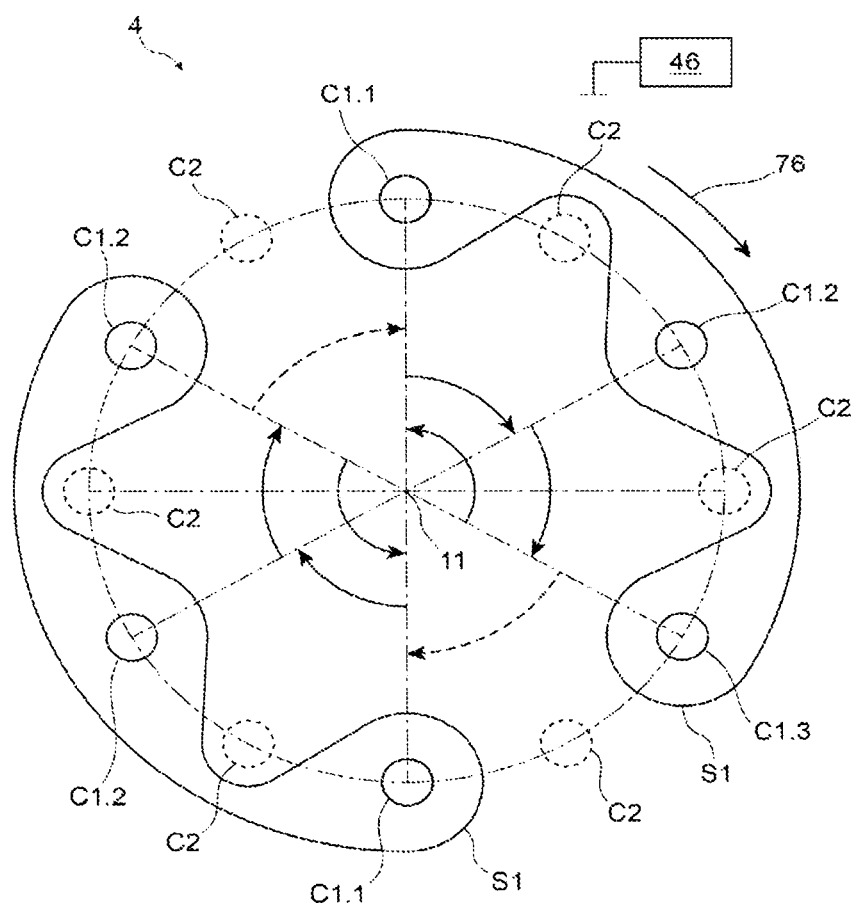
FIG. 7 is a schematic view of the combustion module, according to a first preferred embodiment of the invention.

FIG. 7 represents the module 4 according to a first preferred embodiment of the invention. The assembly of combustion chambers forming this module 4 is divided into a first sub-assembly of first chambers referenced C1.1, C1.2, C1.3, and a second sub-assembly of second chambers referenced C2. As in all the other embodiments, which will be described hereinafter, in the figures, the first chambers C1.i are represented as solid lines, whereas the second chambers are represented as dotted lines.

The first chambers C1.i are identical or substantially identical, and they assume an identical or similar design to that of the previously described chamber 10. They are diametrically opposite two by two. In this first preferred embodiment, six first chambers C1.i, evenly arranged about the central axis 11 of the module and distributed into two series S1 are provided. Both series are identical, each extending on a sector slightly lower than 180° about the axis 11. Both series S1 thus succeed each other along a given sense 76 of the circumferential direction of the module relative to the axis 11, this sense 76 corresponding to the clockwise direction in FIG. 7.

Each series S1 thus comprises three first chambers C1.i, including a first ignition chamber C1.1 located at one of the circumferential ends of the series. Here, the module 4 includes two first diametrically opposite ignition chambers C1.1, each arranged at one end of its associated series.

The first chamber C1.2 directly consecutive to the ignition chamber C1.1, along the given sense 76, is connected to this same ignition chamber C1.1 so as to be supplied with EGR exhaust gases by the same. Identically, the first chamber C1.3 directly consecutive to the first chamber C1.2, along the given sense 76, is connected to this same chamber C1.2 so as to be supplied with EGR exhaust gases by the same. In this regard, it is noted that in the figures, arrows represent EGR connections between the different chambers. Very preferentially, the first ignition chamber C1.1 is also connected to the first chamber C1.3 located at the opposite end within the associated series S1, so as to be supplied with EGR exhaust gases by the same. This makes it possible to have a maintained cycle within each series S1, after this cycle has been triggered by igniting the first chamber C1.1, also called an "ignition chamber". This first ignition of the chamber C1.1 is conventionally carried out. Then, the maintained character of the cycle does not require to perform a conventional ignition at each new passage through the first ignition chamber C1.1, since its supply with EGR exhaust gases from the opposite chamber C1.3 is normally sufficient to cause the required ignition. However, to ensure that the assembly operates properly, a conventional ignition of the first ignition chamber C1.1 can be carried out, at each new rotation or after several rotations. This conventional ignition of the first ignition chamber C1.1, by an appropriate control device, is thus used if need be, but preferentially not at each cycle rotation maintained by the exhaust gas recirculation EGR.

The preceding paragraph describes the maintained character of the cycle within each series S1. Alternatively or simultaneously, the maintained character of the cycle can be made by connecting the series S1 to each other, as depicted by the dotted arrows in FIG. 7. Indeed, the first ignition chamber C1.1 of each series S1 can be connected to the first chamber C1.3 located in the proximity in the adjacent series S1, so as to be supplied with EGR exhaust gases by the same. This makes it possible to have a maintained cycle between series. Even if it will not be further described in the following text, this principle can of course be implemented in an identical or similar way in the other embodiments which will be described hereinafter, without departing from the scope of the invention.

The second chambers C2 are identical or substantially identical, and they assume a similar design to that of the previously described chamber 10, without having the EGR function. Here also, they are diametrically opposite two by two. In this first preferred embodiment, six second chambers C2, evenly arranged about the central axis 11 and forming with the first chambers C1.$i$, an assembly of twelve chambers C1.$i$, C2 evenly arranged and alternately about this axis 11, are also provided.

The control device 46 associated with the module 4 is configured to be able to control the chambers in different ways. For example, in a normal operation, it is preferentially provided that only the first chambers C1.$i$ are active and controlled by the device 46. To do this, the combustion cycles of both first ignition chambers C1.1 are first simultaneously initiated. In each of both series S1, the initiation of a combustion cycle on the directly consecutive first chamber C1.2 is made in a delayed way and using exhaust gases from the first ignition chamber C1.1. The same is true for the combustion cycle of the chamber C1.3 arranged at the other end of the series. Indeed, this cycle is initiated in a delayed way relative to the cycle of the chamber C1.2, and carried out using exhaust gases from the same chamber C1.2.

Figure 8:
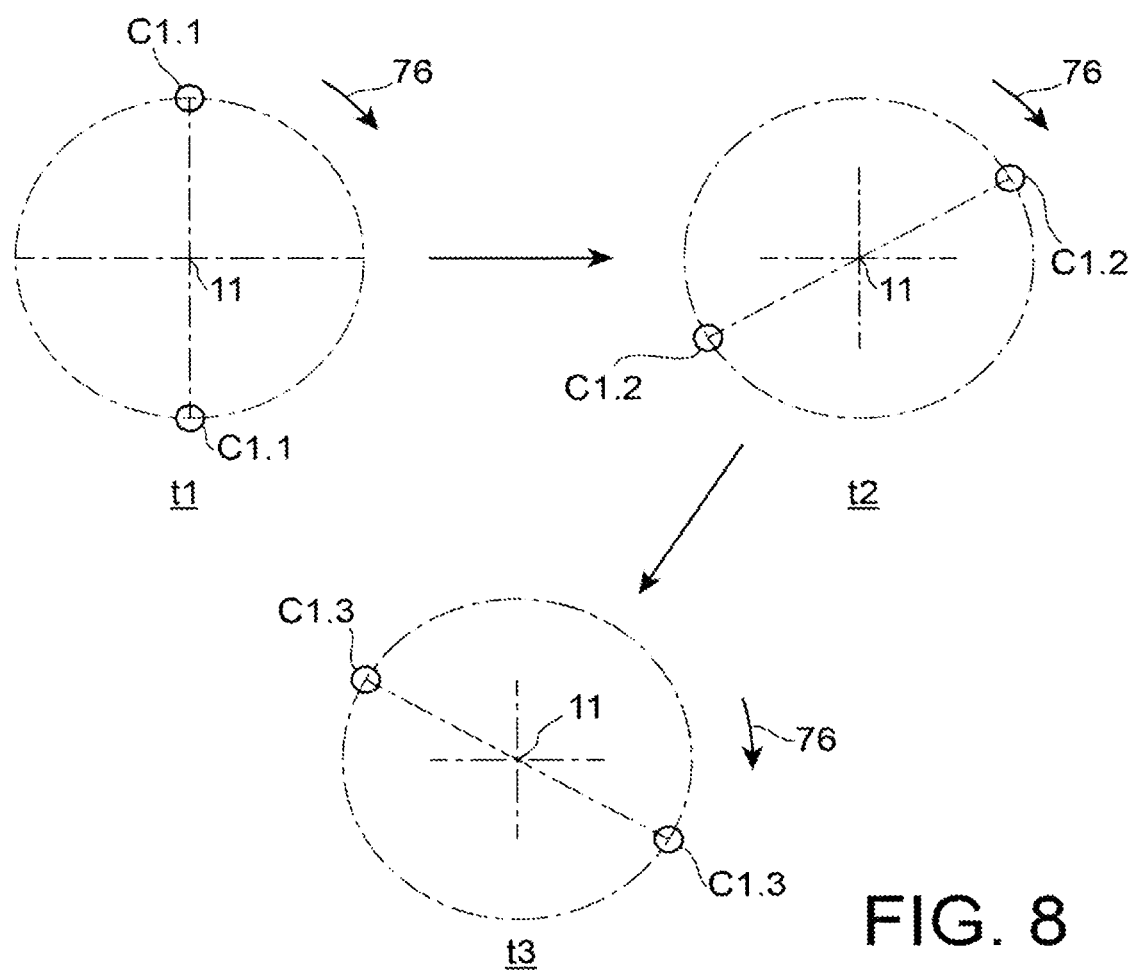
FIG. 8 represents the module of the previous figure depicting the chambers in an exhaust phase at different time instants, during a first exemplary control for this module.

The arrangement provided and the method implemented enable at the outlet of the module 4, a gas flow to be obtained as a rotational wave along the given sense 76, this wave promoting driving the turbine through which this flow has to pass. This principle is depicted in FIG. 8, which represents the chambers in an exhaust phase at different time instants. At a time instant t1, only the first two diametrically opposite ignition chambers C1.1 are in the exhaust phase, thus generating a balanced flow on the turbine disposed downstream. At a subsequent time instant t2, the ignition chambers C1.1 are no longer in the exhaust phase, unlike the chambers C1.2 offset from the ignition chambers C1.1 along the given sense 76. It is the combination of this circumferential offset and the different exhaust time instants between the chambers C1.1 and C1.2 which generates the desired rotational wave specific to the present invention. This wave more over is continues with exhaust at a time instant t3 of gases from the chambers C1.3, which are arranged at the other end of the series, before a new cycle rotation starts by means of the exhaust gas recirculation EGR from the chamber C1.3 to the ignition chamber C1.1. FIG. 8 illustrates the fact that the rotational wave obtained is resolved into two half-waves having a central symmetry, and each propagating on an angular sector corresponding to that along which each first series extends.

Figure 9:
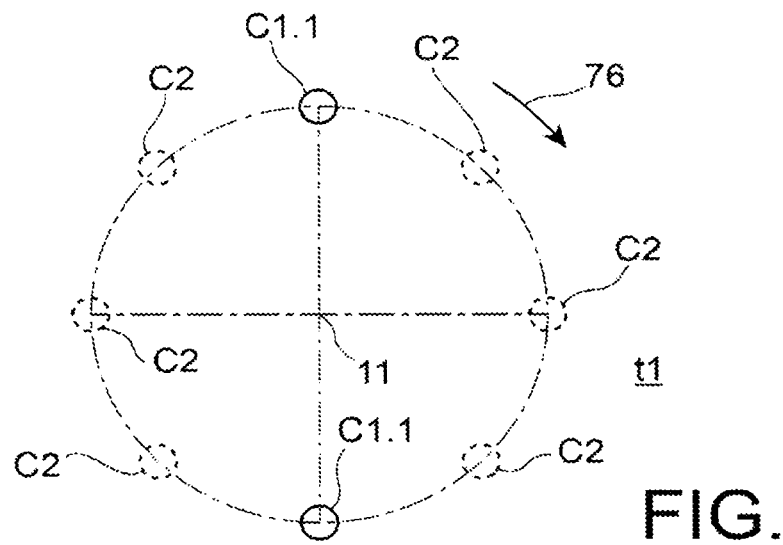
FIG. 9 represents the module of FIG. 7 depicting the chambers in an exhaust phase at a time instant t1, during a second exemplary control for this module.

In another example, in a transitory phase, the aforementioned control for the first chambers C1.$i$ is added to the temporary control of the second chambers C2. As depicted in FIG. 9 for time instant t1, the combustion cycles of all the second chambers C2 are simultaneously initiated, and repeated for the entire transitory phase requiring the generation of a maximum gas flow at the outlet of the module.

Upon operating the turbojet engine, the activation period of time of the second chambers C2 consequently turns out to be reduced relative to that of the first chambers C1.$i$, because it slops at the end of the transitory phase after which these first chambers C1.$i$ continue to be activated and controlled by the device 46.

Figure 10:
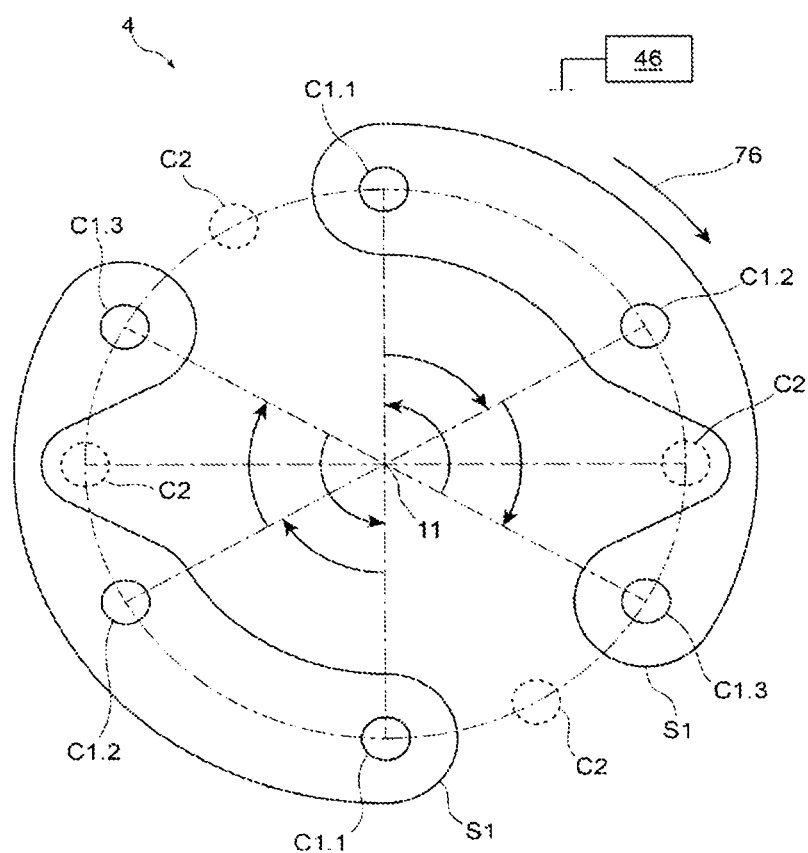
FIG. 10 represents a similar view to that of FIG. 7, with the module being in the form of an alternative embodiment.

The numbers of first and second combustion chambers could however differ from each other with respect to those set out in the first preferred embodiment. By way of indicating example, the number of second chambers C2 could be four, as depicted in the alternative of FIG. 10.

Figure 11:
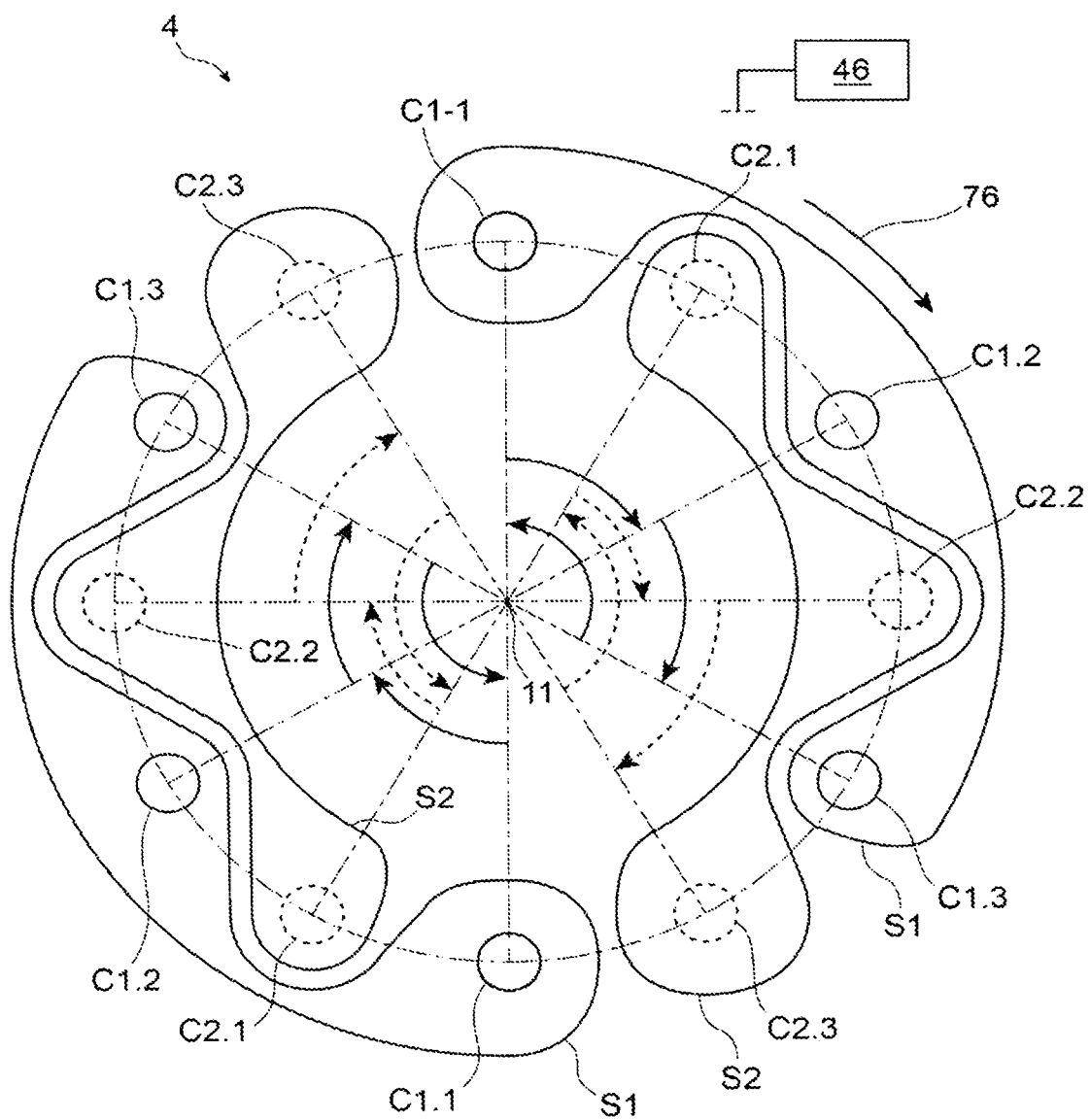
FIG. 11 is a schematic view of the combustion module, according to a second preferred embodiment of the invention.

With reference now to FIG. 11, a combustion module 4 according to a second preferred embodiment of the invention is represented. This second embodiment differs from the first one in that the second chambers of the second sub-assembly are involved in forming the rotational wave. More precisely, the second chambers remain arranged in the same way as in the first embodiment, but they are distributed into two second series S2 interlocked with the first two series S1 which remain unchanged.

Each second series S2 thus includes three second chambers referenced C2.1, C2.2, C2.3, all identical or substantially identical, and of an identical or similar design to that of the previously described chamber 10. In this second preferred embodiment, therefore six second chambers C2.$i$ distributed into two second identical series S2 each extending on a sector slightly lower than 180° about the axis 11 are provided. Both series S2 thereby succeed each other along the given sense 76.

In the same way as the first series S1, each second series S2 comprises a second ignition chamber C2.1 located at one of the circumferential ends of the series. Here, the module 4 thus includes two second diametrically opposite ignition chambers C2.1, each arranged at one end of its associated series. Each second ignition chamber C2.1 is preferably located directly consecutive relative to one of the first ignition chambers C1.1, in the given sense 76 or in the opposite sense.

The second chamber C2.2 directly consecutive to the ignition chamber C2.1, along the given sense 76, is connected to the same ignition chamber C2.1 so as to be supplied with EGR exhaust gases by the same. Identically, the second chamber C2.3 directly consecutive to the second chamber C1.2, along the given sense 76, is connected to this same chamber C2.2 so as to be supplied with EGR exhaust gases by the same. Finally, very preferentially, the second ignition chamber C2.1 is also connected to the second chamber C2.3 located at the opposite end within the associated series S2, so as to be supplied with EGR exhaust gases by the same. This makes it possible to have a maintained cycle within each series S2, as explained above for the series S1.

In this second preferred embodiment of the invention, the control device 46 associated with the module 4 is configured to control the first and second chambers C1.$i$, C2.$i$ simultaneously, namely to carry out control of all these chambers over an identical and simultaneous activation period of time.

Nevertheless, two possibilities remain in controlling both sub-assemblies of chambers. The first possibility, depicted in FIG. 12, consists in providing an identity in performing combustion cycles for the first and second series S1, S2. This implies that the combustion cycles of the first two ignition chambers C1.1 and two second ignition chambers C2.1 are first simultaneously initiated. In each of both series S2, initiating a combustion cycle on the directly consecutive second chamber C2.2 is performed in a delayed way and using exhaust gases from the first ignition chamber C2.1. It is performed concomitantly with the initiation of the combustion cycle on the first chamber C1.2. The same is true for the combustion cycle of the chamber C2.3 arranged at the other end of the series. Indeed, this cycle is initiated in a delayed way relative to the cycle of the chamber C2.2, and carried out using exhaust gases from the same chamber C2.2, at a same time instant as that of the first chamber C1.3.

The arrangement provided and the method implemented thus enable at the outlet of the module 4, a gas flow as a rotational wave to be obtained along the given sense 76, this wave being created by the twelve chambers C1.$i$, C2.$i$.

Figure 12:
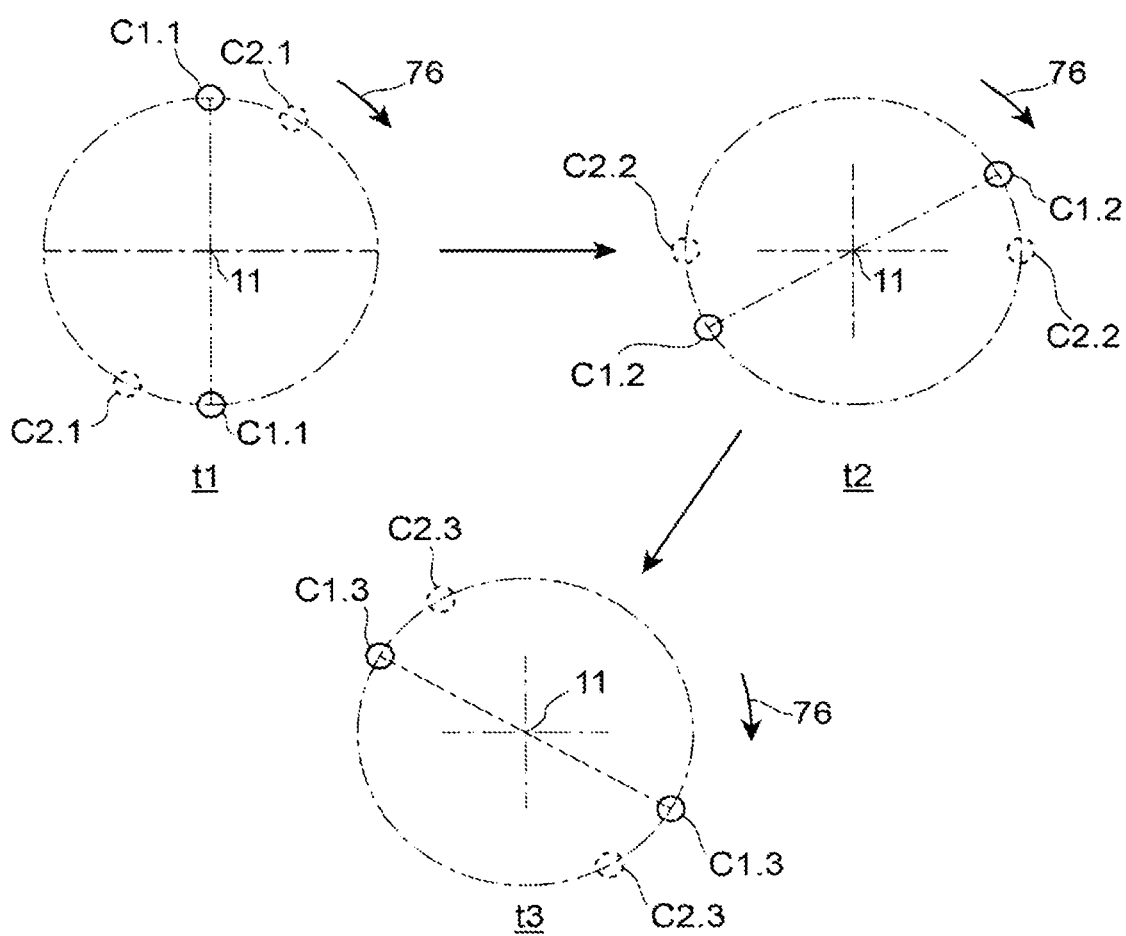
FIG. 12 represents the module of the previous figure depicting the chambers in an exhaust phase at different time instants, during a first exemplary control for this module.

Indeed, at a time instant t1 represented in FIG. 12, only the four ignition chambers C1.1, C2.1 diametrically opposite two by two are in the exhaust phase, thus generating a balanced flow on the turbine disposed downstream. At a subsequent time instant t2, the ignition chambers C1.1, C2.1 are no longer in the exhaust phase, unlike the four chambers C1.2, C2.2 offset from the ignition chambers C1.1, C2.1 along the given sense 76. The wave continues with the exhaust at a time instant t3 of the gas from the four chambers C1.3, C2.3, arranged at the other end of the series.

Figure 13:
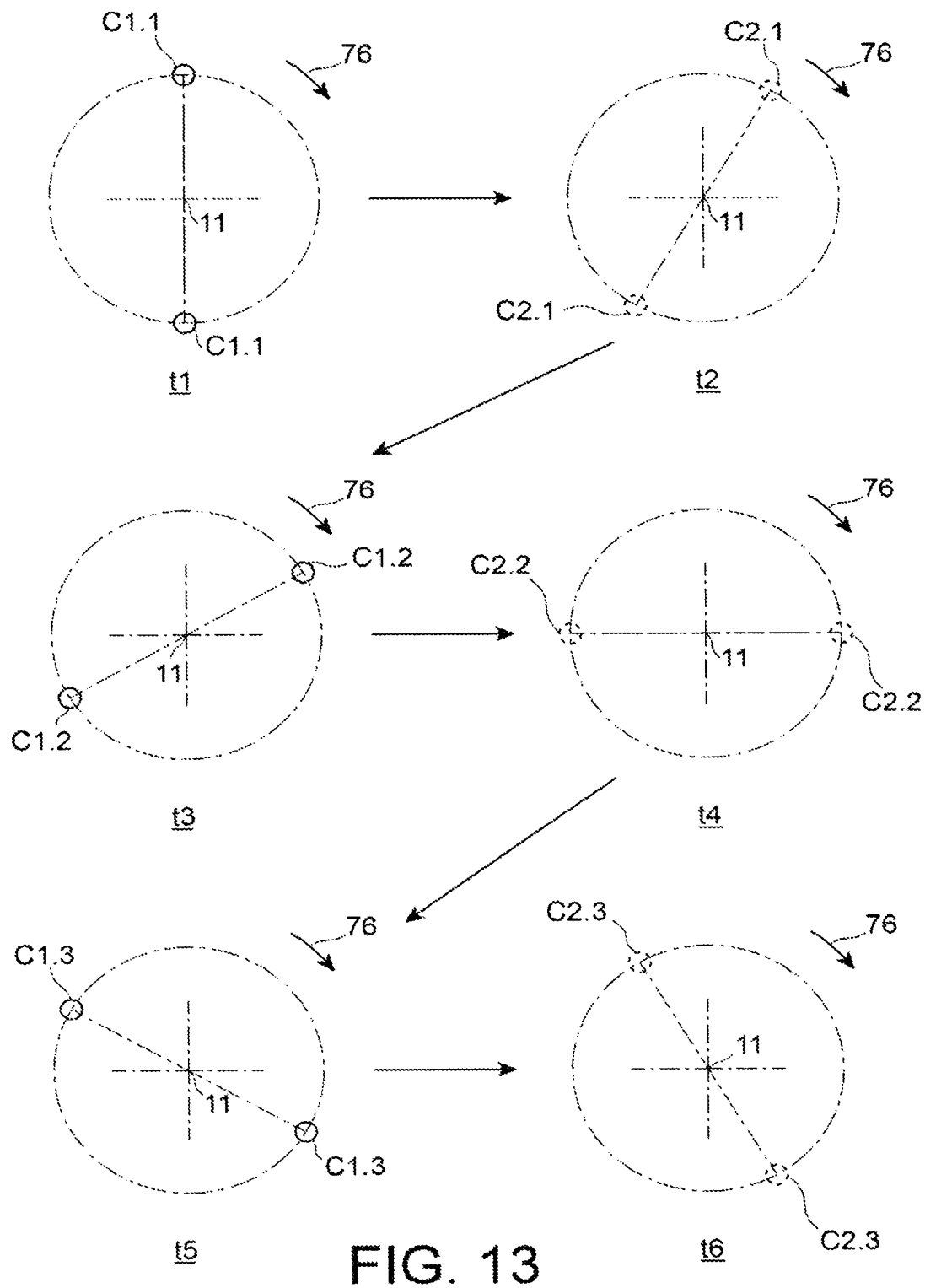
FIG. 13 represents the module of FIG. 11 depicting the chambers in an exhaust phase at different time instants, during a second exemplary control for this module.

The second possibility, depicted in FIG. 13, consists in providing a phase shift in carrying out the combustion cycles for the first and second series S1, S2. This implies that the combustion cycles of both second ignition chambers C2.1 are initiated with a delay relative to the initiation of the cycles of the first two ignition chambers C1.1.

The rotational wave generated at the outlet of the module thus assumes a different configuration, because it is no longer produced at three distinct time instants, but at six successive time instants as depicted in FIG. 13.

Indeed, at a time instant t1, only the two diametrically opposite ignition chambers C1.1 are in the exhaust phase, thus generating a balanced flow on the turbine disposed downstream. At a subsequent time instant t2, the ignition chambers C1.1 are no longer in the exhaust phase, unlike both ignition chambers C2.1 offset from the ignition chambers C1.1 along the given sense 76. The wave continues with the exhaust at a time instant t3 of the gases from the two first chambers C1.2, and then both second chambers C2.2 at a time instant t4, and so forth until a time instant t6 corresponding to the exhaust of gases from both second chambers C2.3 arranged at the ends of the second series.

Figure 14:
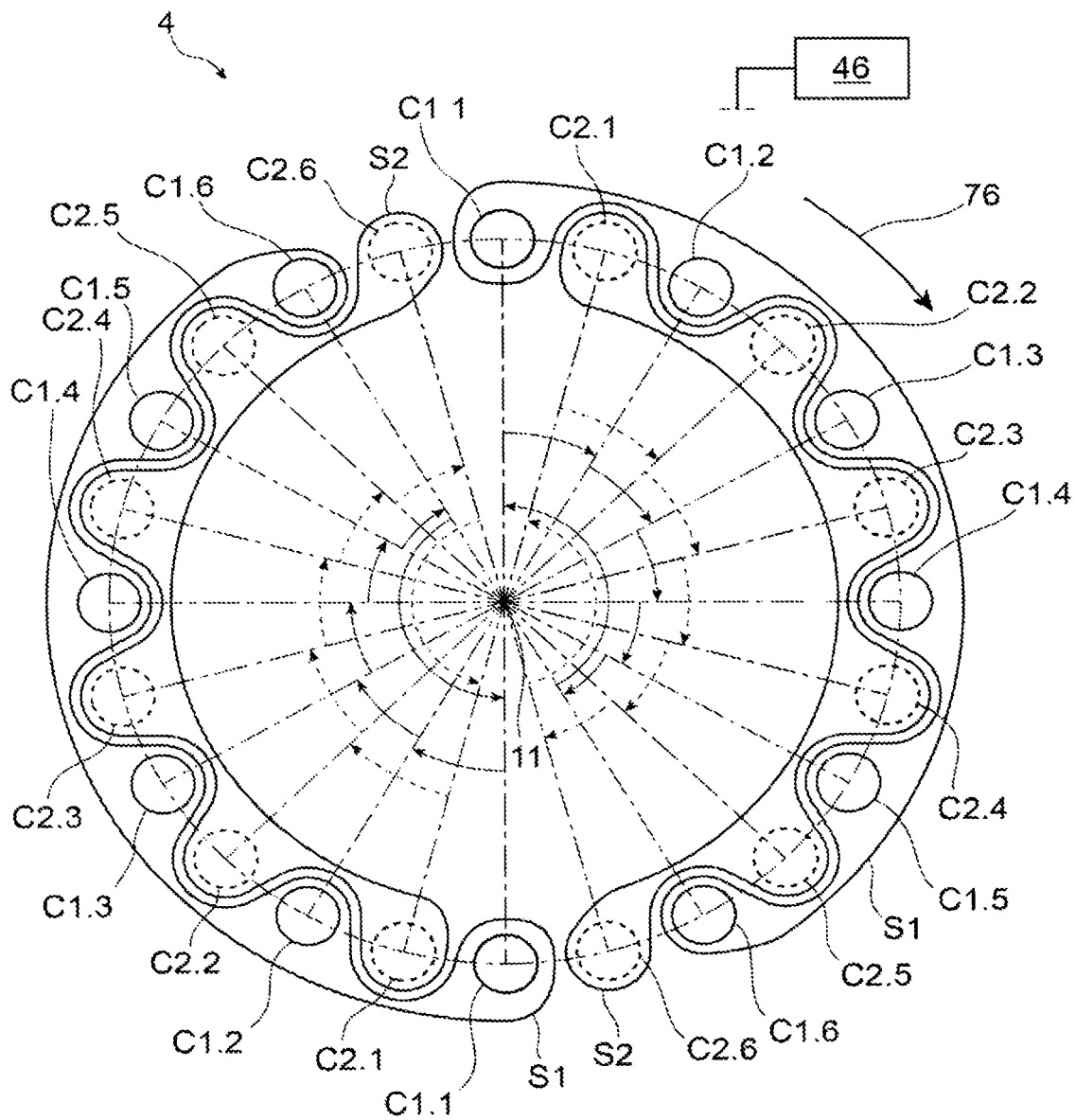
FIG. 14 represents a view similar to that of FIG. 11, with the module being in the form of an alternative embodiment.
Figure 15:
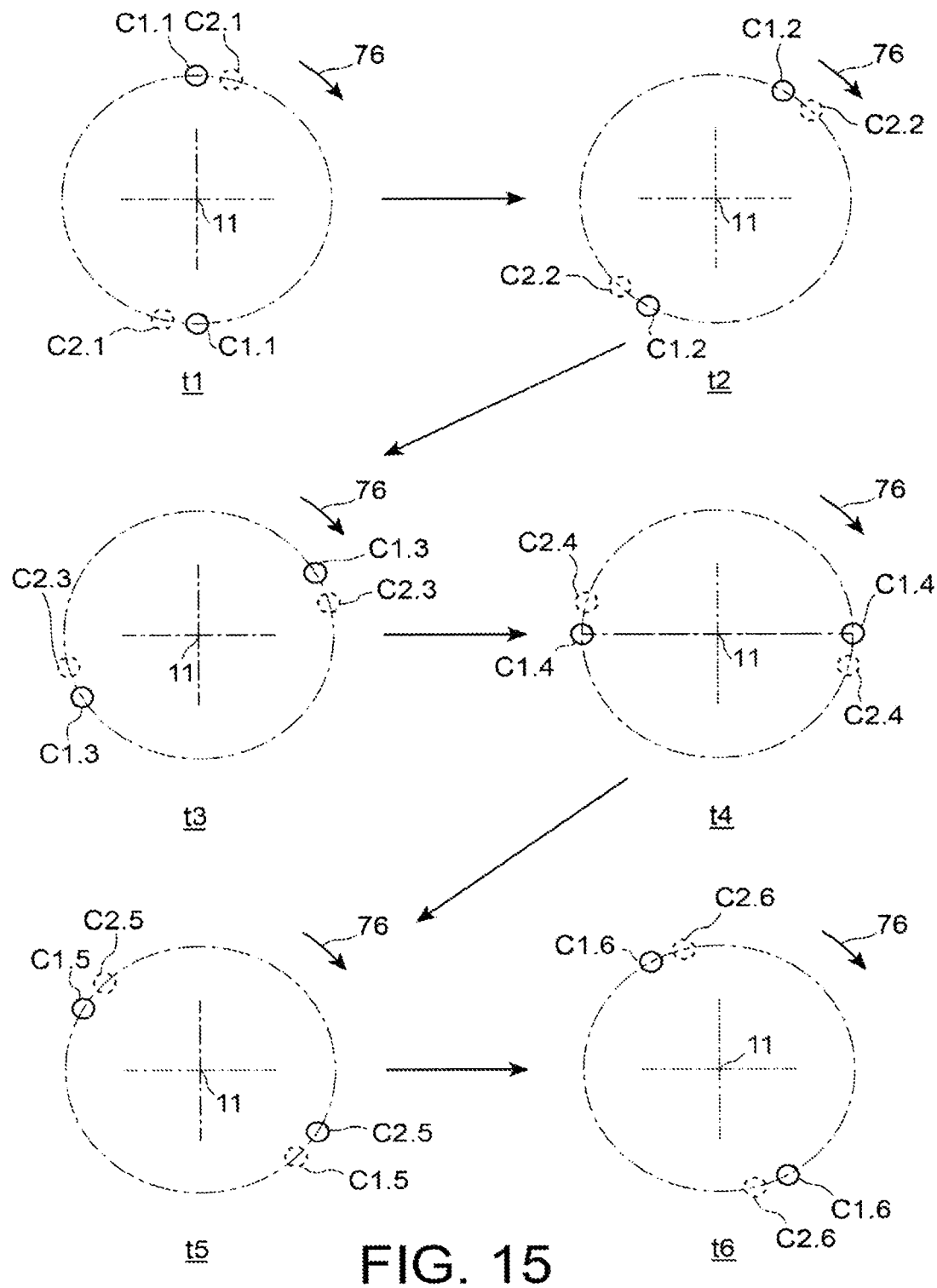
FIG. 15 represents the module of the previous figure depicting the chambers in an exhaust phase at different time instants, during an exemplary control for this module.

FIG. 14 represents an alternative for implementing the second embodiment, by providing series S1, S2 each equipped with six chambers, and no longer three. The control and operation principles for this module 4 remain identical to those depicted in FIGS. 12 and 13 for three chambers per series. For example, FIG. 15 represents the principle of an identity in carrying out combustion cycles for the first and second series S1, S2, without a phase shift. Consequently, the wave in the form of two half-waves is produced at six successive time instants, referenced t1 to t6 in FIG. 15.

Figure 16:
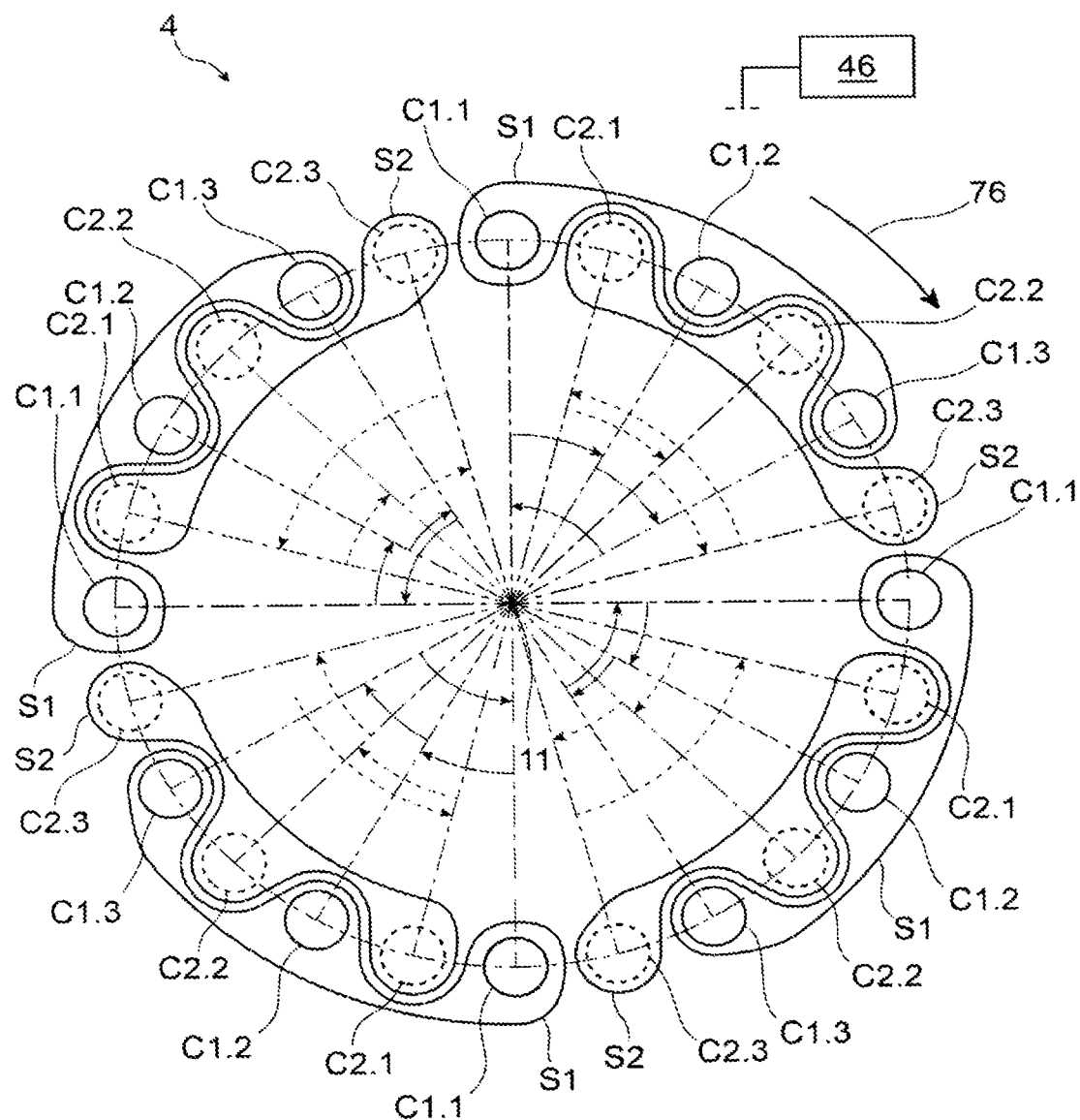
FIG. 16 is a schematic view of the combustion module, according to a third preferred embodiment of the invention.
Figure 17:
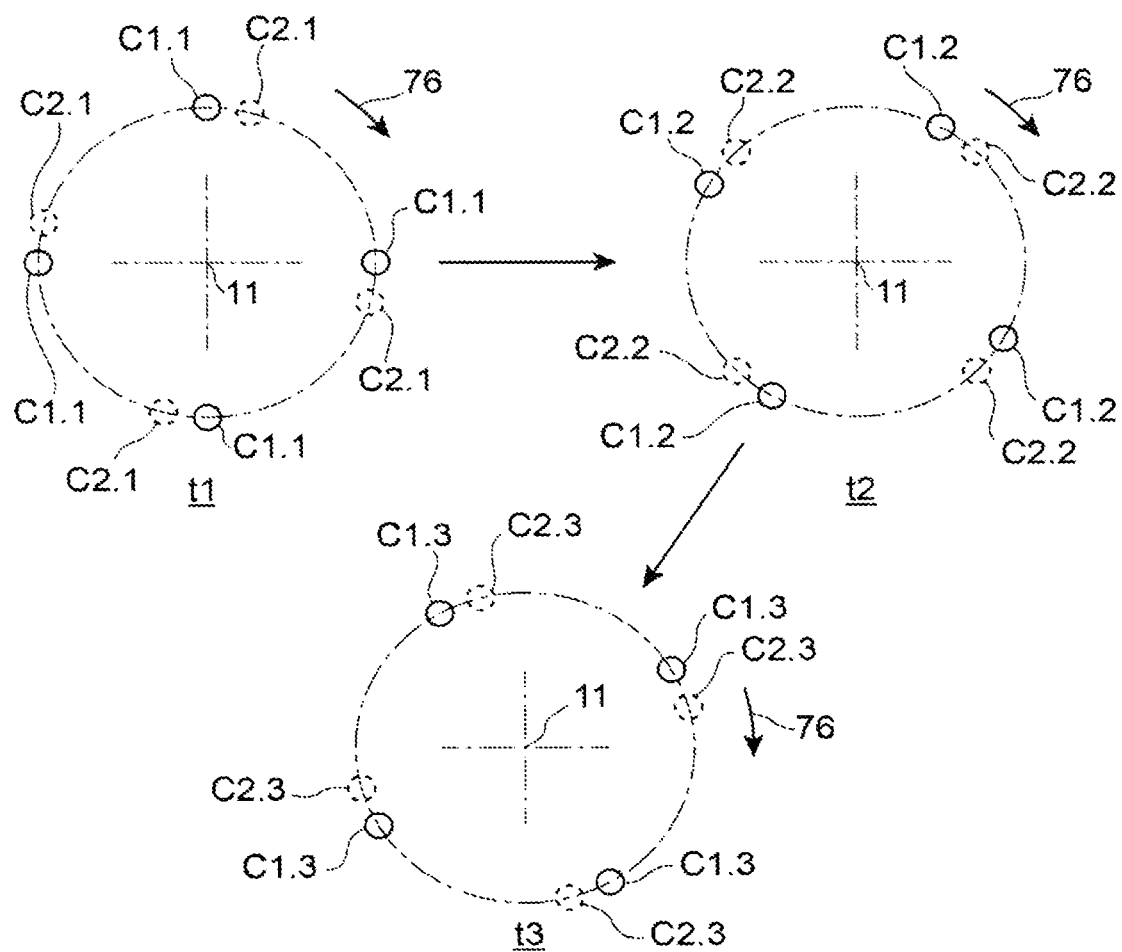
FIG. 17 represents the module of the previous figure depicting the chambers in an exhaust phase at different time instants, during an exemplary control for this module.

FIG. 16 represents a module 4 according to a third preferred embodiment of the invention. This module 4 has strong similarities with that of the second embodiment, in that all the first and second chambers C1.$i$, C2.$i$ are involved in creating the rotational wave. The difference only resides in the number of series, because instead of providing two first series S1 and two second series S2, four first series S1 and four second series S2 are provided. Each of them extends on an identical angular sector slightly lower than 90°, and comprising three chambers. The first four series S1 are identical, and evenly spaced by being diametrically opposite two by two. The same is true for the second series S2. Thereby, instead of being in the form of two half-waves, the rotational wave formed at the outlet of this module is in the form of four quarter waves each extending substantially over 90°, as is visible in FIG. 17. These four quarter waves are herein also symmetric two by two, with a central symmetry relative to the axis 11.

Figure 18:
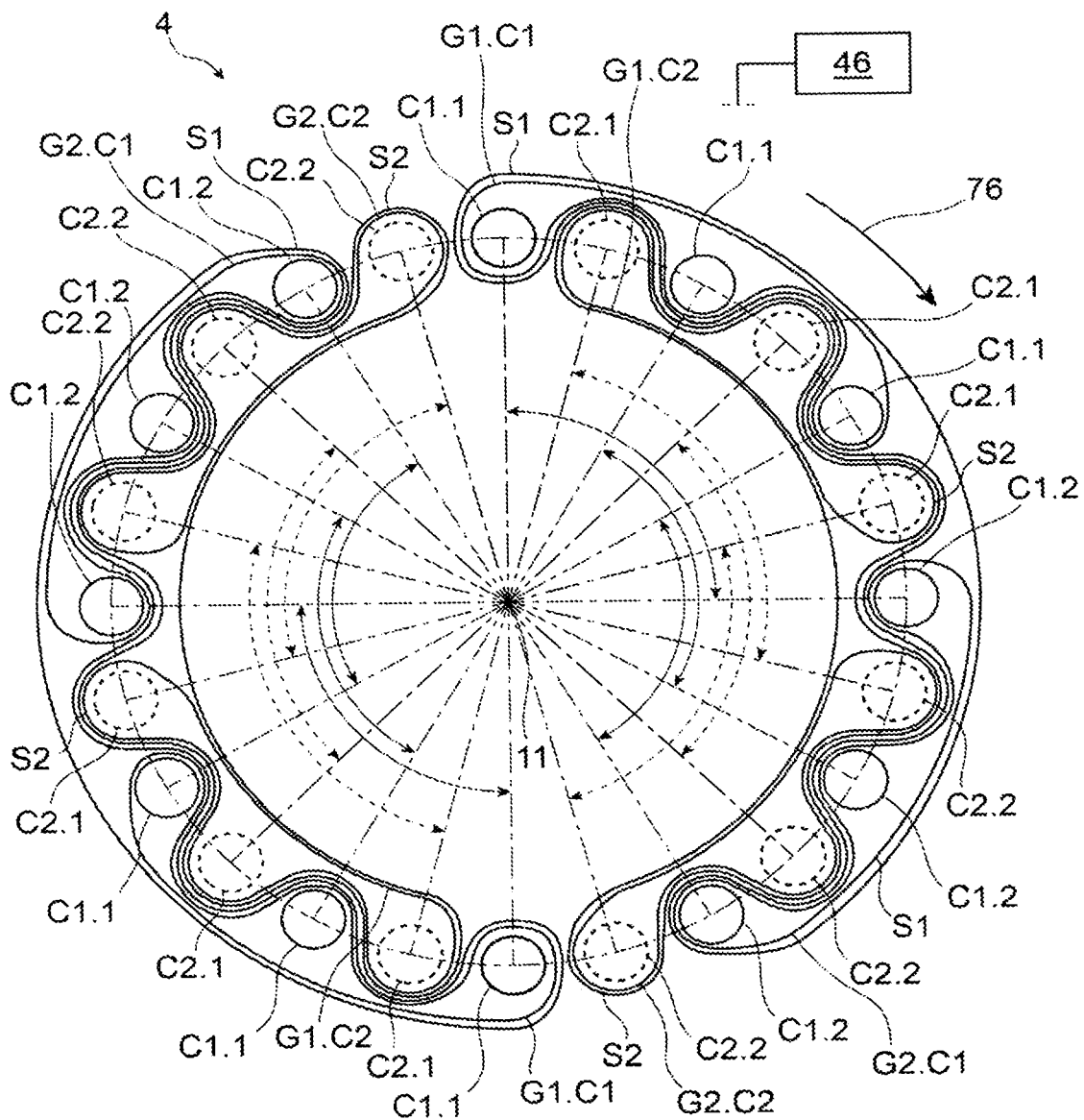
FIG. 18 is a schematic view of the combustion module, according to a fourth preferred embodiment of the invention.

FIG. 18 represents a module 4 according to a fourth preferred embodiment, having two first series S1 as well as two second series S2, as in the second embodiment and its alternative visible in FIGS. 11 and 14. Each series here includes six chambers C1.$i$, C2.$i$, but unlike the previous embodiments, any chamber of one of the series is not necessarily controlled with a delay with respect to the chamber directly preceding it within the same series. Indeed, each first series S1 includes at one of its ends, a first group G1.C1 of first ignition chambers C1.1. Here there are three of them, but this number could be different, without departing from the scope of the invention. These three chambers C1.1 are followed along direction 76 by a second group G2.C1 of three other first chambers C1.2 which are directly consecutive. The six chambers C1.1 and C1.2 are thereby connected two by two by the EGR function, such that the first ignition chamber C1.1 appearing first along the given sense 76, supplies with EGR exhaust gases the first chamber C1.2 appearing first along the same sense, and so forth up to the last chambers C1.1, C 1.2 of the series. Here again, EGR connections are very preferentially provided in the reverse sense between the above-described chambers, for maintaining the cycle by exhaust gas recirculation EGR.

An identical cooperation is applied within each second series S2 of second chambers C2.$i$, making two groups G1.C2, G2.C2 the chambers of which are connected two by two by the EGR function.

Figure 19:
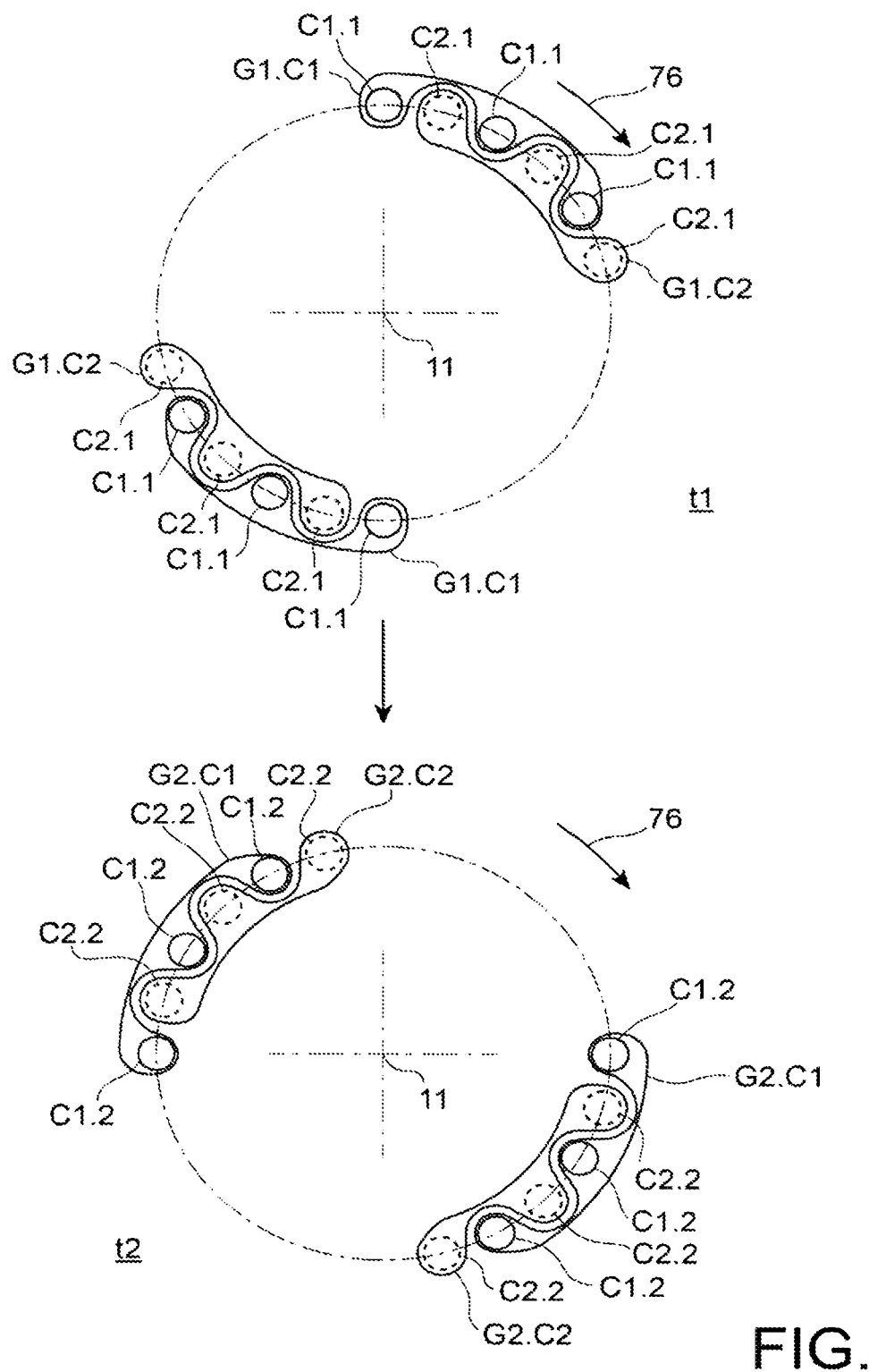
FIG. 19 represents the module of the previous figure depicting the chambers in an exhaust phase at different time instants, during an exemplary control for this module.

An example of operating principle is depicted in FIG. 19, which represents the chambers in the exhaust phase at different time instants. At a time instant t1, all the first two ignition chambers C1.1 as well as all the second ignition chambers C2.1 are simultaneously in the exhaust phase, thus generating a balanced flow on the turbine disposed downstream. At a subsequent time instant t2, the ignition chambers C1.1, C2.1 are no longer in the exhaust phase, unlike all the chambers C1.2, C2.2 offset from the ignition chambers C1.1, C2.1 along the given sense 76, and supplied with EGR exhaust gases by the same.

Preferably, the second sub-assembly of chambers is thus independent of the first sub-assembly of chambers. This implies that the second chambers are not connected to the first chambers by EGR connections, of the type of those implemented between the first chambers.

Figure 20:
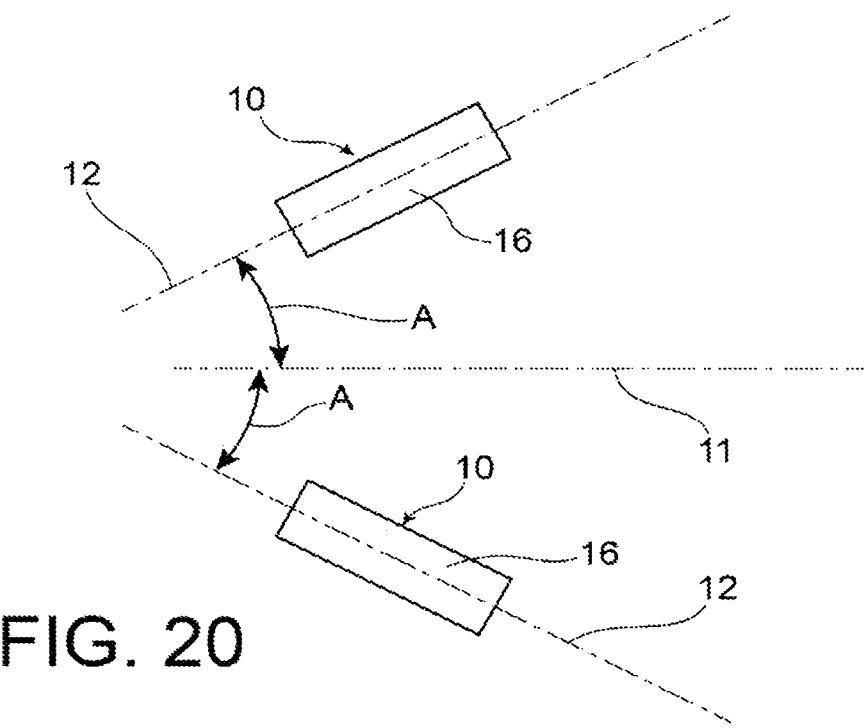
FIG. 20 schematically represents the combustion module according to a fifth preferred embodiment of the invention.

In all the previously described embodiments, the chambers of the module 4 all have a central chamber axis 12 parallel to the longitudinal central axis 11 of the module, about which these chambers are distributed. According to a fifth embodiment depicted in FIG. 20, the enclosure of the combustion chamber 10 extends about a central chamber axis 12 having a tilt angle A relative to the central axis 11 of the module. This angle A, for example between 10 and 60°, can be the same for each chamber 10. Additionally, the chamber axes 12 can be convergent as in FIG. 20, or assume other orientations, for example by being parallel to each other. This tilt of the axes 12 enables the impact angle of the exhaust gas flow to be adjusted on the turbine blades, in particular for the purpose of limiting blocking risks for this turbine.

Figure 21:
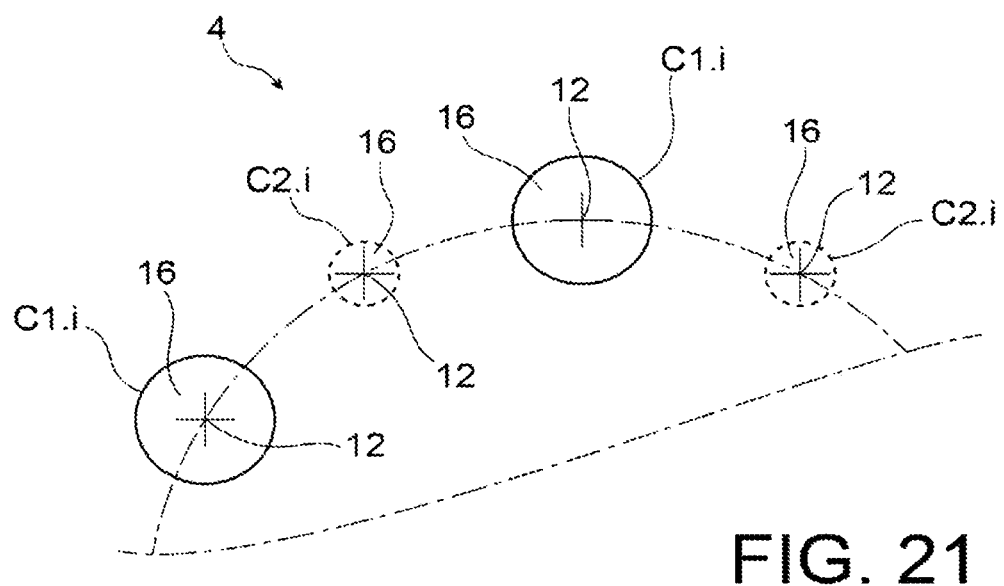
FIG. 21 schematically represents the combustion module according to a sixth preferred embodiment of the invention.

By means of the formation of two independent sub-assemblies, the first and second chambers can be of different geometries. In particular, the enclosures 16 of the first chambers C1.$i$ can have different volumes from those of the second chambers C2.$i$. This specificity is depicted in FIG. 21 representing a sixth preferred embodiment of the invention, in which the diameters of the enclosures 16 of the second chambers C2.$i$ are lower than the diameters of the enclosures 16 of the first chambers C1.$i$. Of course, the volume variation could be alternatively or simultaneously obtained with a different enclosure length for the first and second chambers. This volume variation also contributes to limiting blocking risks for this turbine.

Figure 22:
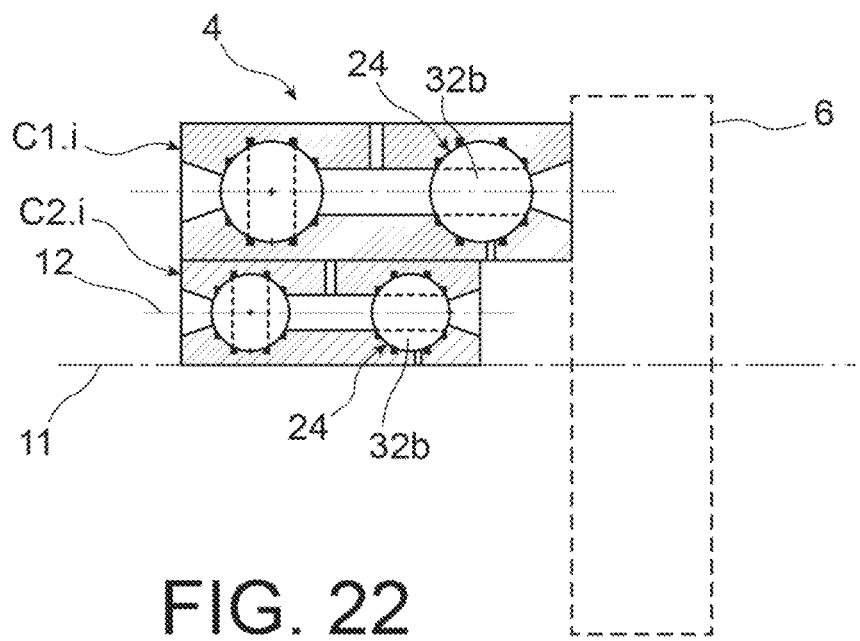
FIG. 22 schematically represents a part of a combustion module according to a seventh preferred embodiment of the invention.

For the same purpose, FIG. 22 represents a seventh preferred embodiment in which the spherical plugs 32$b$ of the exhaust valves 24 are located at different distances from the turbine module 6. More precisely, the plugs 32$b$ of the first chambers C1.$i$ are offset from the plugs 32$b$ of the second chambers C2.$i$, along the central axis 11 of the module. The plugs 32$b$ of the first chambers C1.$i$ can be axially closer to the turbine module 8 than the plugs 32$b$ of the second chambers C2.$i$, or conversely.

Figure 23:
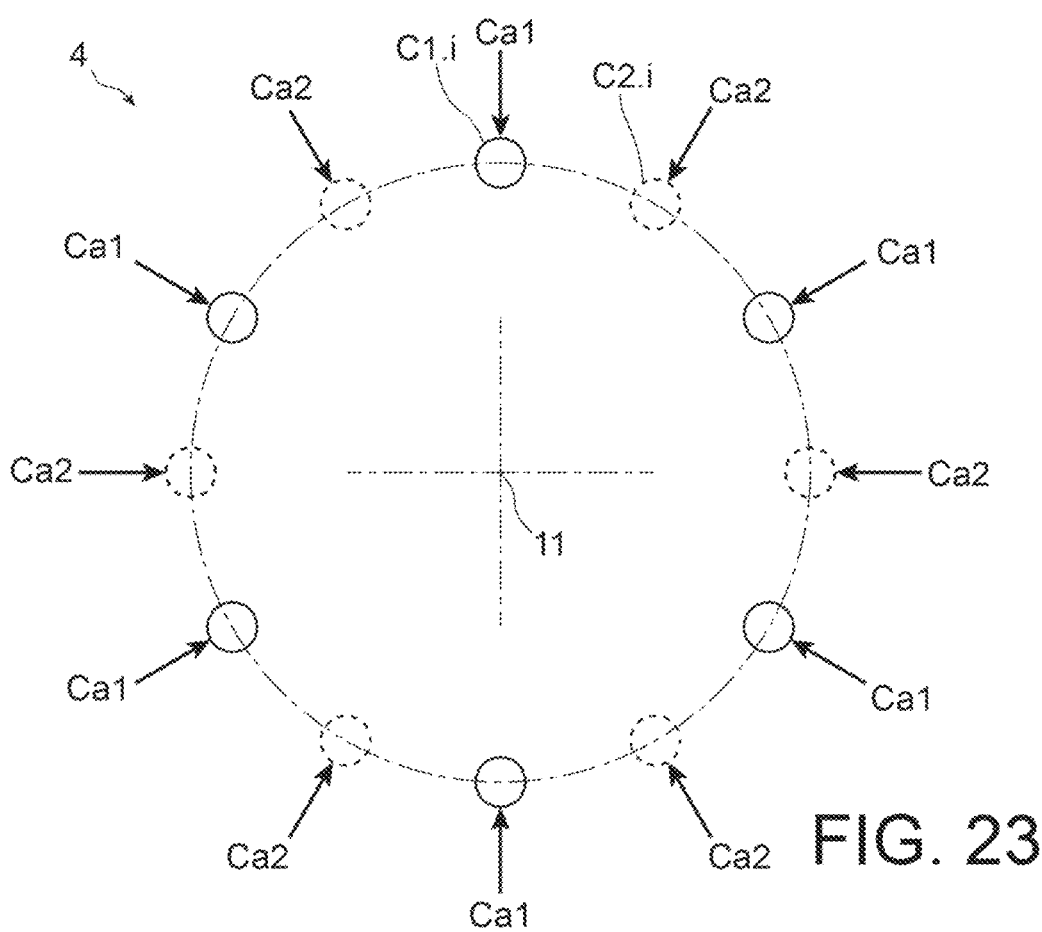
FIG. 23 schematically represents a part of a combustion module according to an eighth preferred embodiment of the invention.

Finally, FIG. 23 represents a module according to an eighth preferred embodiment of the invention, in which the combustion enclosures of the first chambers C1.$i$ are supplied with a fuel Ca1 different from the fuel Ca$t$ supplying the second chambers C2.$i$.

Preferably, one of the fuels Ca1, Ca$t$ is hydrogen, and the other is Kerosene. This enables both exhaust gas flows of different compositions to be mixed, and a mixture having reduced nitrogen oxide (NOx) emissions to be obtained.

Of course, various modifications can be provided by those skilled in the art to the invention just described, only by way of non-limiting examples. In particular, the numbers of combustion chambers, series, groups of chambers can differ with respect to those shown in the description, without departing from the scope of the invention. Moreover, the characteristics of all the embodiments, and their alternatives, can still be combined.

The invention claimed is:

1. A module for an aircraft turbomachine comprising an assembly of combustion chambers distributed about a central axis of the module, each combustion chamber being a constant-volume combustor, and comprising a compressed gas intake means for taking in compressed gas into a combustion enclosure of each combustion chamber, an exhaust gas discharge means for discharging exhaust gas outside of each combustion enclosure, the module also comprising a device for controlling each compressed gas intake means and each exhaust gas discharge means, wherein the assembly of combustion chambers comprises a first sub-assembly of chambers and a second sub-assembly of chambers, wherein the first sub-assembly of chambers comprises at least six first chambers evenly distributed about the central axis of the module, the first chambers being distributed equally within at least a first series of first chambers and a second series of first chambers wherein the first series of first chambers is identical to the second series of first chambers, the first series of first chambers including at least three first chambers and the second series of first chambers including at least three first chambers, wherein the at least three first chambers of the first series of first chambers are not interposed between the at least three first chambers of the second series of first chambers, wherein a first of the at least three first chambers of the first series of first chambers diametrically opposes a first of the at least three first chambers of the second series of first chambers, a second of the at least three first chambers of the first series of first chambers diametrically opposes a second of the at least three first chambers of the second series of first chambers and a third of the at least three first chambers of the first series of first chambers diametrically opposes a third of the at least three first chambers of the second series of first chambers, wherein the first of the at least three first chambers of the first series of first chambers is connected to the second of the at least three first chambers of the first series of first chambers, the second of the at least three first chambers of the first series of first chambers is connected to the third of the at least three first chambers of the first series of first chambers and the third of the at least three first chambers of the first series of first chambers is connected to the first of the at least three first chambers of the first series of first chambers, wherein the first of the at least three first chambers of the second series of first chambers is connected to the second of the at least three first chambers of the second series of first chambers, the second of the at least three first chambers of the second series of first chambers is connected to the third of the at least three first chambers of the second series of first chambers and the third of the at least three first chambers of the second series of first chambers is connected to the first of the at least three first chambers of the second series of first chambers so as to supply all the first chambers with exhaust gases, wherein the device is configured such that for all the first chambers, disposed in pairs diametrically opposite each other, combustion cycles are simultaneously initiated, and wherein the second sub-assembly of chambers comprises at least four second chambers disposed in pairs diametrically opposite each other.

2. The module according to claim 1, wherein a number of second chambers is identical to a number of first chambers, wherein the second chambers are evenly distributed about the central axis of the module, and wherein the first chambers and the second chambers form the assembly of combustion chambers.

3. The module according to claim 2, wherein the second chambers are distributed within at least a first series of second chambers and a second series of second chambers wherein the first series of second chambers is identical to the second series of second chambers, the first series of second chambers comprising at least three second chambers and the second series of second chambers comprising at least three second chambers, wherein a first of the at least three second chambers of the first series of second chambers diametrically opposes a first of the at least three second chambers of the second series of second chambers, a second of the at least three second chambers of the first series of second chambers diametrically opposes a second of the at least three second chambers of the second series of second chambers, a third of the at least three second chambers of the first series of second chambers diametrically opposes a third of the at least three second chambers of the second series of second chambers, wherein the first of the at least three second chambers of the first series of second chambers is connected to the second of the at least three second chambers of the first series of second chambers, the second of the at least three second chambers of the first series of second chambers is connected to the third of the at least three second chambers of the first series of second chambers and the third of the at least three second chambers of the first series of second chambers is connected to the first of the at least three second chambers of the first series of second chambers, wherein the first of the at least three second chambers of the second series of second chambers is connected to the second of the at least three second chambers of the second series of second chambers, the second of the at least three second chambers of the second series of second chambers is connected to the third of the at least three second chambers of the second series of second chambers and the third of the at least three second chambers of the second series of second chambers is connected to the first of the at least three second chambers of the second series of second chambers, so as to supply all the second chambers with exhaust gases.

4. The module according to claim 3, wherein the device is configured such that for all the second chambers, disposed in pairs diametrically opposite each other, combustion cycles are simultaneously initiated.

5. The module according to claim 3, wherein the device is configured such that for all the second chambers, disposed in pairs diametrically opposite each other, combustion cycles are simultaneously initiated, with a delay relative to the combustion cycles of the first chambers.

6. The module according to claim 1, wherein a sum of a number of first chambers and a number of second chambers is between 10 and 100.

7. The module according to claim 1, wherein the assembly of combustion chambers have at least one of the following characteristics:
the combustion enclosure of each combustion chamber extends about a respective central axis of each combustion chamber having a tilt relative to the central axis of the module;
the combustion enclosures of the first chambers have a different volume from that of the combustion enclosures of the second chambers;
the exhaust gas discharge means of the first chambers are offset from the exhaust gas discharge means of the second chambers, along the central axis of the module.

8. The module according to claim 1, wherein the combustion enclosures of the first chambers of the first sub-assembly of chambers are supplied with a first fuel different from a second fuel supplied to the second chambers of the second sub-assembly of chambers.

9. The module according to claim 1, wherein the second sub-assembly of chambers is independent of the first sub-assembly of chambers.

10. An aircraft turbomachine comprising the module according to claim 1.

11. A method for controlling the module for the aircraft turbomachine according to claim 1, wherein:
within the first series of first chambers and the second series of first chambers, following initiation of a combustion cycle on the first of the at least three first chambers of a respective series of first chambers, initiating a combustion cycle on the second of the at least three first chambers of the respective series of first chambers, wherein the initiating is performed in a delayed manner and uses the exhaust gases from the first of the at least three first chambers of the respective series of first chambers, and initiation of a combustion cycle on the third of the at least three first chambers of the respective series of first chambers is performed in a delayed manner and uses the exhaust gases from the second of the at least three first chambers of the respective series of first chambers; and
the second chambers are active and controlled by the device over an identical activation period of time simultaneous to an activation period of time for the first chambers, or only over a reduced activation period of time relative to that of the first chambers.

12. The module according to claim 2, wherein the first chambers and the second chambers are evenly distributed about the central axis of the module.

13. The module according to claim 2, wherein the first chambers and the second chambers are arranged alternately.

14. The module according to claim 7, wherein the respective central axes of each combustion chamber are not tilted relative to the central axis of the module, the respective central axes of the first chambers and the second chambers are parallel to each other.

15. The module according to claim 7, wherein the combustion enclosures of the first chambers have a different lengths and/or diameters than that of the combustion enclosures of the second chambers.

16. The module according to claim 8, wherein one of the first fuel or the second fuel is hydrogen.

17. The aircraft turbomachine according to claim 10, wherein, the central axis of the module corresponds to a longitudinal central axis of the aircraft turbomachine.

18. The module according to claim 1, wherein at least one of
the first of the at least three first chambers of the first series of first chambers,
the first of the at least three first chambers of the second series of first chambers,
the second of the at least three first chambers of the first series of first chambers,
the second of the at least three first chambers of the second series of first chambers,
the third of the at least three first chambers of the first series of first chambers or
the third of the at least three first chambers of the second series of first chambers includes a group of directly consecutive first chambers.

19. The module according to claim 3, wherein at least one of
the first of the at least three second chambers of the first series of second chambers,
the first of the at least three second chambers of the second series of second chambers,
the second of the at least three second chambers of the first series of second chambers,
the second of the at least three second chambers of the second series of second chambers, the third of the at least three second chambers of the first series of second chambers or the third of the at least three second chambers of the second series of second chambers includes a group of directly consecutive second chambers.

* * * * *